US010569411B1

(12) United States Patent
Schulz

(10) Patent No.: US 10,569,411 B1
(45) Date of Patent: *Feb. 25, 2020

(54) TRUSS JIGGING SYSTEM

(71) Applicant: Jack A. Schulz, Monett, MO (US)

(72) Inventor: Jack A. Schulz, Monett, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,955

(22) Filed: Feb. 15, 2019

Related U.S. Application Data

(63) Continuation-in-part of application No. 15/727,944, filed on Oct. 9, 2017, now abandoned, which is a continuation-in-part of application No. 14/510,515, filed on Oct. 9, 2014, now Pat. No. 9,782,888.

(60) Provisional application No. 61/888,570, filed on Oct. 9, 2013.

(51) Int. Cl.
*B23Q 1/28* (2006.01)
*B25H 1/10* (2006.01)
*E04C 3/16* (2006.01)

(52) U.S. Cl.
CPC . *B25H 1/10* (2013.01); *E04C 3/16* (2013.01)

(58) Field of Classification Search
CPC .. B25B 11/02; B25H 1/02; B25H 1/06; B25H 1/08; B25H 1/10
USPC ........... 100/48, 913; 227/152–155; 29/281.1, 29/291.3; 269/37, 43, 111, 250, 251, 304
See application file for complete search history.

(56) References Cited

U.S. PATENT DOCUMENTS

| | | | | |
|---|---|---|---|---|
| 2,940,322 | A | 6/1960 | Uhing | 74/22 R |
| 3,826,188 | A | 7/1974 | Eberle | 100/100 |
| 4,943,038 | A | 7/1990 | Harnden | 269/320 |
| 5,048,409 | A | 9/1991 | Schulz | 100/48 |
| 6,318,251 | B1 | 11/2001 | Schulz | 100/48 |
| 6,427,831 | B1 | 8/2002 | Norton | 198/841 |
| 6,702,269 | B1 | 3/2004 | Tadich | 269/304 |
| 7,922,158 | B2 | 4/2011 | Fredrickson | 269/37 |
| 9,782,888 | B1 | 10/2017 | Schulz | 269/304 |
| 2009/0084468 | A1 | 4/2009 | Koskovich | 144/345 |
| 2016/0023312 | A1 | 1/2016 | Svensson | 29/281.1 |

*Primary Examiner* — William V Gilbert
(74) *Attorney, Agent, or Firm* — Jonathan A. Bay

(57) ABSTRACT

A truss jigging system has an elongated table having a lower support deck supporting a plurality of spaced slot-defining C-shaped or T-shaped rails with infill panels filling spaces in between to define a truss-piece support. The table has a plurality of the carriages moving in the slots and moving locating pins or pucks that extend above the support plane to select positions. Linear drive systems drive the carriages to and fro. The locating pins (or pucks), the carriages and the drive systems therefor are all preferably located above the base plane of the lower support deck in order to accommodate a 'X-Y scrolling vertical press style' which has a heavy lower crossbeam that scrapes or skims laterally left and right closely underneath the lower support deck.

20 Claims, 33 Drawing Sheets

TRUSS JIGGING SYSTEM

CROSS-REFERENCE TO RELATED APPLICATION(S)

This application is a continuation-in-part of U.S. patent application Ser. No. 15,727,944, filed Oct. 9, 2017; which is a continuation-in-part of U.S. patent application Ser. No. 14,510,515, filed Oct. 9, 2014, now U.S. Pat. No. 9,782,888; which claims the benefit of U.S. Provisional Application No. 61/888,570, filed Oct. 9, 2013. The foregoing patent disclosures are fully incorporated herein by this reference thereto.

BACKGROUND AND SUMMARY OF THE INVENTION

The invention relates to work holders and, more particularly, to a truss jigging system with provisions for reducing the length of time between changing from one jig formation to another.

Home architects are always striving for new and fresh designs to appeal to the new home buyer and/or home renovator who wants something distinctive. One of the ways to provide fresh new designs is to design elaborate truss-supported structures where nearly every truss has a unique design. Hence there is pressure from the marketplace for truss jigging systems which have a very short times between changing from one jig formation to another.

It is an object of the invention to provide a fully automatic truss jigging system, wherein the time to change jig formation is as short as a minute to just a few minutes. This object of the invention is achieved by controllable drive systems that are driven from a controller and spin a drive belt or chain. Albeit, it is expected that user will give the controller and manual signal to make the change of the jig formation.

It is an alternate object of the invention to provide a semi-automatic truss jigging system. This is not a backward step from the previous object of the invention. Instead, this allows for, among other things, a user to make a last second personal intervention to make fine, last-minute adjustments.

It is a further object of the invention to a truss jigging system with manual drives for changing the jig formation (eg., like a hand crank or a wrench put to service as a hand crank). And again, this object is also not a backward step from the previous two. When architects and/or builders are designing and constructing a distinctive and elaborate structure, the unexpected might happen. There might be a need to make a last truss based on measurements made by the builder in the field. The manual drive provisions might make the changeover time a lot slower than the fully automatic and semi-automatic provisions. However, when workers feel like they aren't getting exactly what they need, and to the point where they mistrust the computers, the manual speed-drive provisions restore the jig template formation fully back to humans.

These and other aspects and objects are provided according to the invention in a truss jigging system comprising the following.

There is a table forming a support plane on which work pieces are supported and extending between a front edge and a spaced-away back edge and being elongated side to side between a left side edge and a spaced-away right side edge.

The table is formed with a plurality of elongated, narrow surface slots through the support plane and extending on generally parallel axes to each other in the front to back direction, the surface slots being recessed down in the table to widen out into enlarged, tubular slideways that are spaced below the support plane and correspondingly are elongated and extend generally parallel with the same axis as the respective surface slot.

There are a plurality of locating pins, and, a plurality of carriages for not only inserting into the slideways for sliding transit therein but also for carrying one of the plurality of locating pins for sliding transit therewith while the locating pin extends through the surface slot and protrudes above the support plane.

There is furthermore a plurality of drive belts or chains, one each for each carriage, and, a plurality of return provisions (eg., idler wheels or sprockets or else static rub surfaces and so on), one such return provision each for each slideway, and each disposed proximate the front edge of table to service a respective one of the slideways, as well as, a plurality of drive wheels or sprockets, one each for each slideway, and each disposed proximate the back edge of table to service a respective one of the slideways.

Wherein, each drive belt or chain is strung around a respective one of the return provisions and a respective one of the drive wheels or sprockets to form a pair of elongated runs, one run being an elongated return run and the other run having a respective one of the carriages affixed thereto and coursing through the respective slideway that the respective two wheels service, such that, driving the drive wheel or sprocket moves the locating pin back and forth along the front to back axis of the respective surface slot.

It is optional that the table defines a plurality of inverted-T shaped slots wherein the vertical parts correspond to the surface slots and horizontal parts correspond to the slideways.

The table might further comprises a pair of parallel jigging bars for each inverted-T shaped slot.

The table might moreover further comprises a support deck below the level of and for supporting the jigging bars, the support deck extending between a front edge and a spaced-away back edge and being elongated side to side between a left side edge and a spaced-away right side edge.

Preferably, the jigging bars have top surfaces level with the support plane. and The table might correspondingly comprises a multiplicity of infill sections which are elongated between a front edge and spaced back edge and compact between spaced front and right edges, and sized for filling in between each of the plurality of pairs of jigging bars that define a respective one of the plurality of invert-T shaped slots and are supported by the support deck for presenting a work surface level with the tops of the jigging bars and level with the support plane. It is preferred then that, at least one adjacent pair of a jigging bar and infill section define a tubular conduit parallel to the horizontal part of the inverted-T shaped slot and providing a passageway for the return run of the drive belt or chain.

It is a preferred aspect of the invention to further provide the following:— a second plurality of plurality of locating pins;

a second plurality of carriages for not only inserting into the slideways for sliding transit therein but also for carrying one of the second plurality of locating pins for sliding transit therewith while the locating pin extends through the surface slot and protrudes above the support plane;

a second plurality of drive belts or chains, one each for each of the second plurality of carriages;

a second plurality of return provisions, one each for each slideway, and each disposed proximate the front edge of table to service a respective one of the slideways;

a second plurality of drive wheels or sprockets, one each for each slideway, and each disposed proximate the back edge of table to service a respective one of the slideways;

wherein each of the second plurality of drive belts or chains is strung around a respective one of the second plurality of return provisions and a respective one of the second plurality of drive wheels or sprockets to form a pair of elongated runs, one run being an elongated return run and the other run having a respective one of the second plurality of carriages affixed thereto and coursing through the respective slideway that the respective two wheels service such that, driving the drive wheel or sprocket moves the locating pin back and forth along the front to back axis of the respective surface slot; and wherein each slideway services two carriages, one of the first plurality and one of the second plurality, which cannot pass each other but can be driven independently.

The table might further defines a pair of tubular conduits flanking each slideway, one providing a passageway for the return run of the respective one of the first plurality of drive belts or chains and the other providing a passageway for the return run of the respective one of the second plurality of drive belts or chains.

It is preferred to provide a plurality of drive motors, one each for driving a respective one of the plurality of drive wheels or sprockets, as well as, a control system for controlling the plurality of drive motors.

It is furthermore preferred if the return provisions are mounted to the table flush below the support plane so that, other than the locating pins and work pieces, the airspace above support plane proximate the front edge of the table is otherwise clear.

The plurality of drive motors may be mounted to the table along the back edge such that the project above the support plane.

For maintenance and adjustment purposes, it is preferred to provide a plurality of tensioning systems, one each for a respective one of each of the plurality of belts or chains. Each tensioning system might be implemented in the form of comprising a horizontally-adjustable mounting provision that is adjustable back and forth in the front to back direction and provides a mounting provision for one of the drive wheels (or sprockets) or return provisions.

The drive belts or chains can be reckoned as relatively 'endless' in several different ways. One way includes the following. That is, each belt or chain includes the respective carriage affixed thereto whereby the carriage forms a splice between opposed tag ends of the belt.

This application is commonly-invented, commonly-owned with U.S. Pat. No. 5,048,409, entitled Truss Fabrication Machine with Joystick Controls; and U.S. Pat. No. 6,318,251, entitled Automatic Control System for a Truss Fabricating Machine, the disclosures of which are fully incorporated herein by this reference thereto.

Applicant hereof is successor-in-interest to the business built around the Eberle-style "Truss Fabricating Machine," as disclosed in part by U.S. Pat. No. 3,826,188 by George F. Eberle. A more appropriated descriptive name of an Eberle-style "Truss Fabricating Machine" might be an 'X-Y scrolling vertical press style' of a truss fabricating machine. The foregoing patent disclosure of the Eberle patent is likewise fully incorporated herein by this reference thereto.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

Figure 1A:
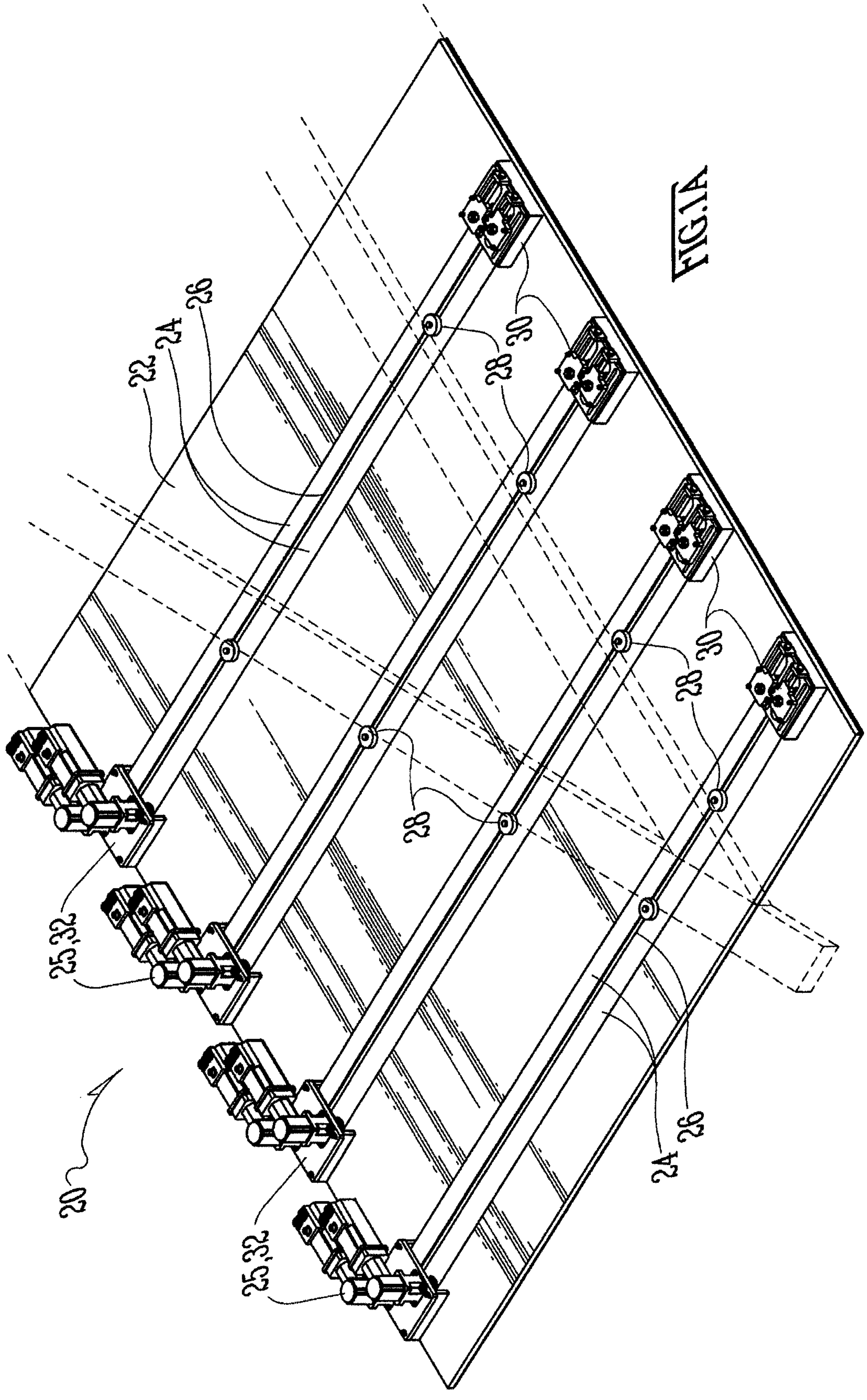
FIG. 1A is a perspective view of a truss jigging system in accordance with the invention, with portions broken away.
Figure 1B:
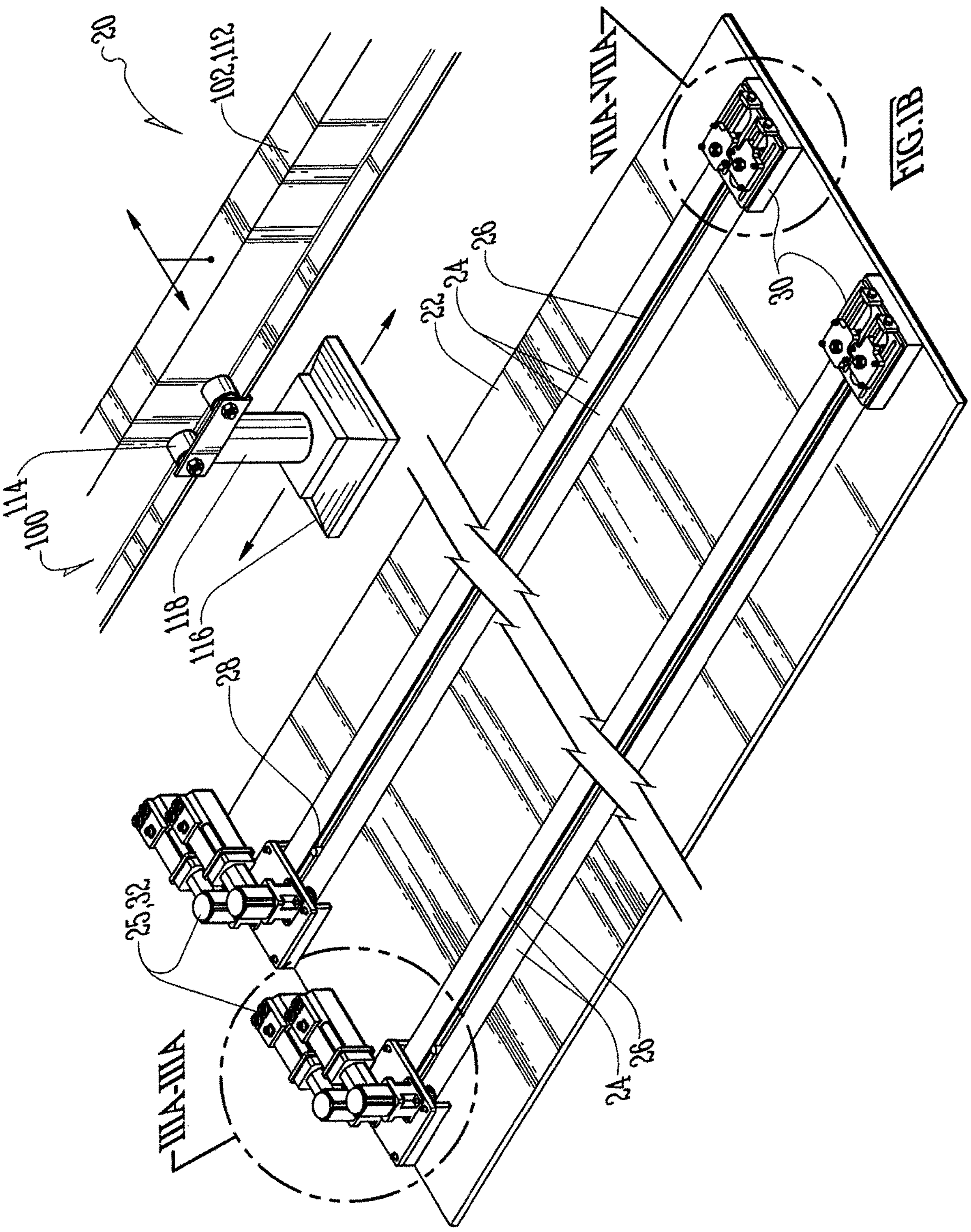
FIG. 1B is a perspective view comparable to FIG. 1A, except on an enlarged scale and with further portions broken away.
Figure 3A:
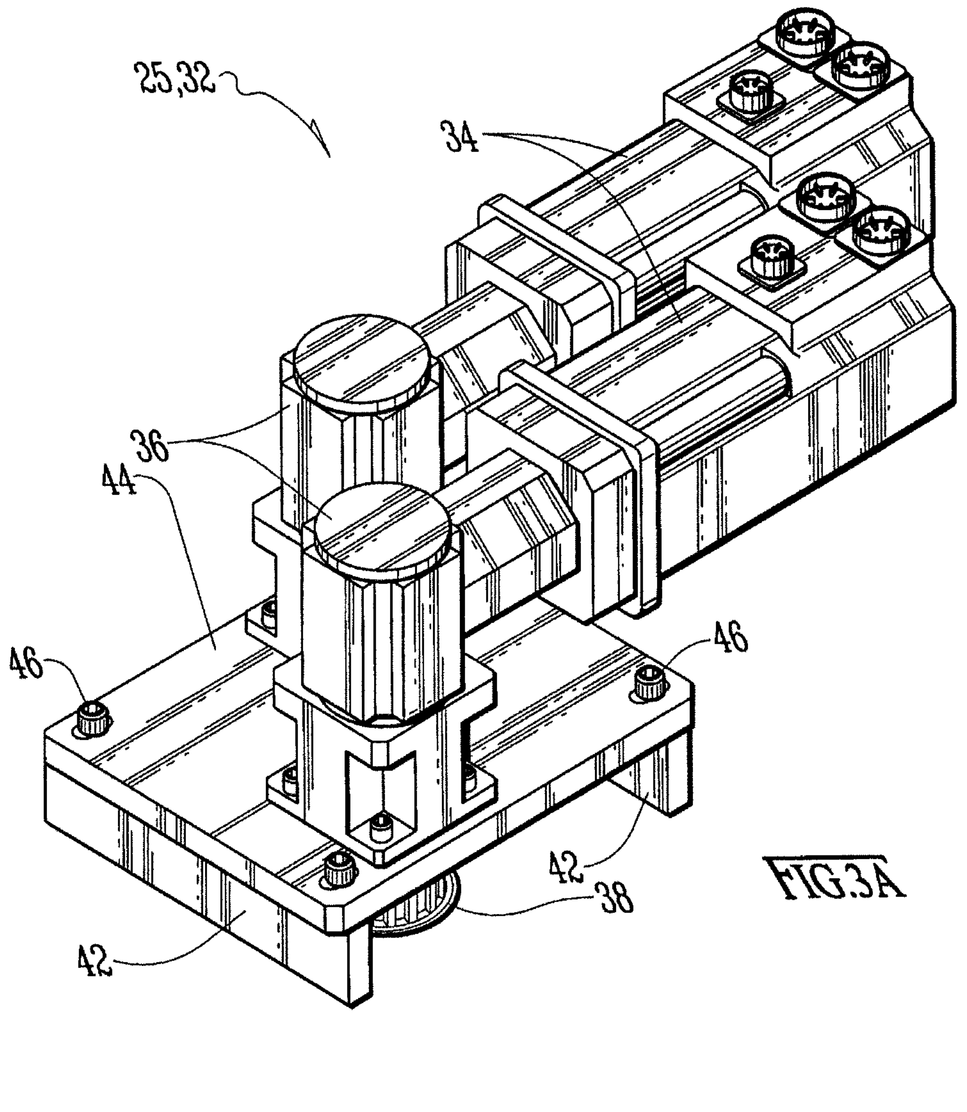
FIG. 3A is an enlarged scale perspective view of detail IIIA-IIIA in FIG. 1B, comprising a first embodiment of a drive system in accordance with the invention.
Figure 13:
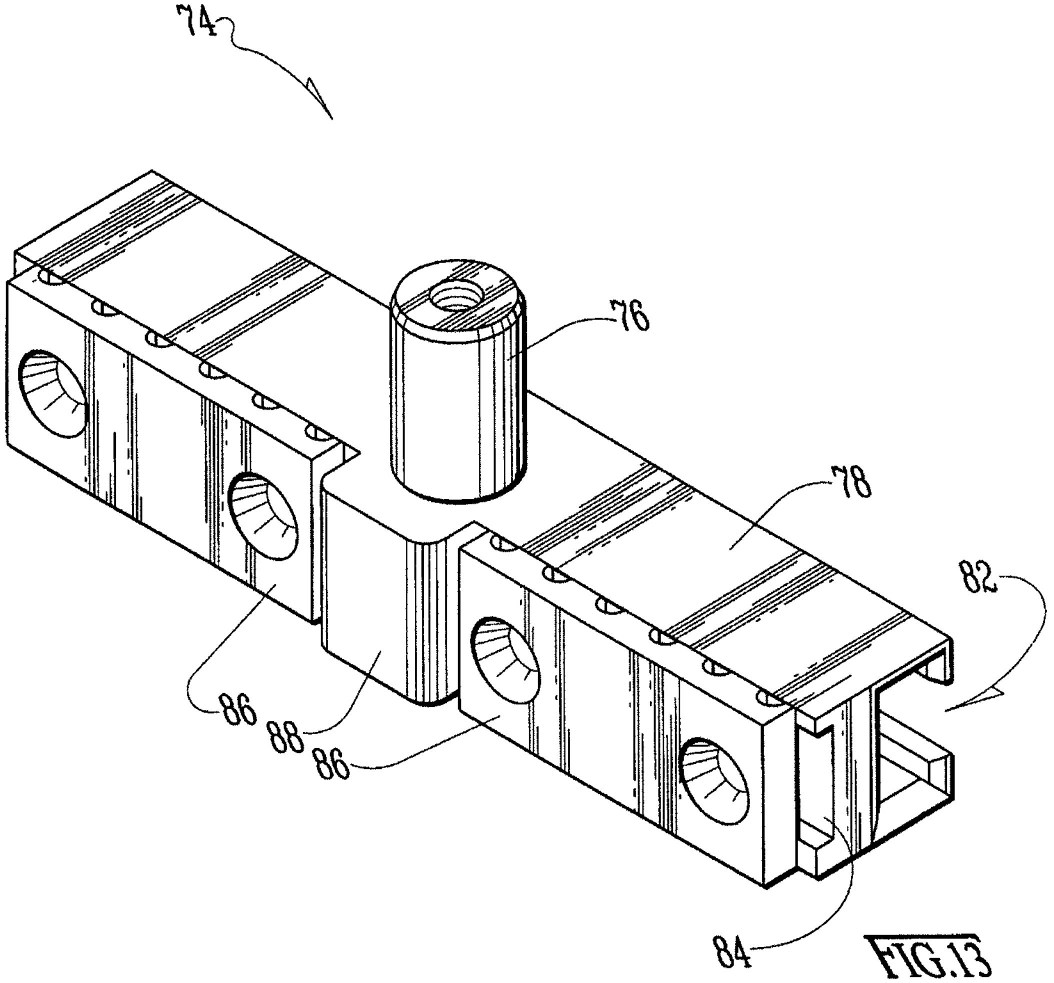
FIG. 13 is an enlarged scale perspective view of a single puck carriage for the truss jigging system in accordance with the invention, wherein an above-table puck as typical of the eight shown in FIG. 1A is removed from view.
Figure 14:
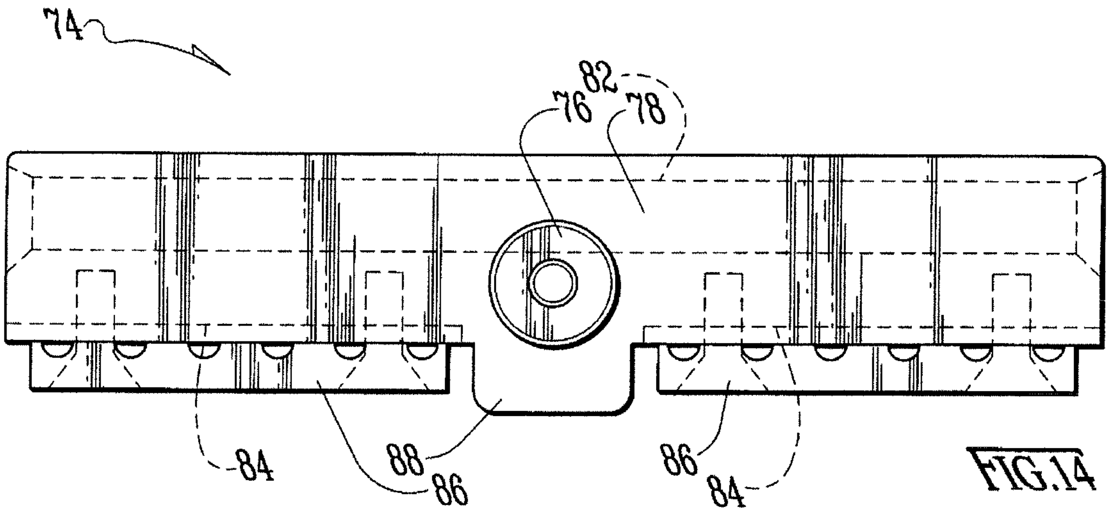
FIG. 14 is a top plan view of FIG. 13.
Figure 18:
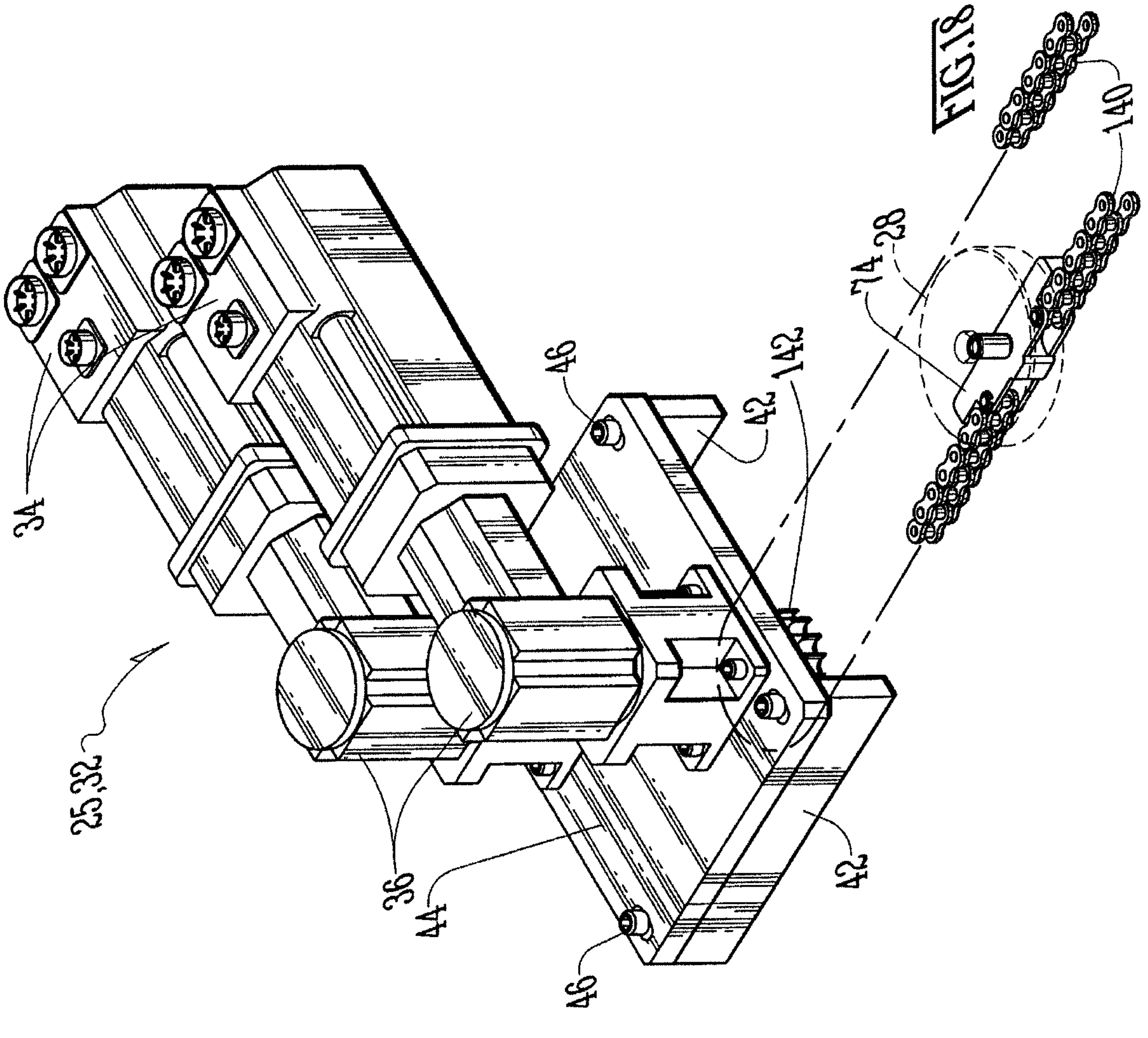
Figure 19:
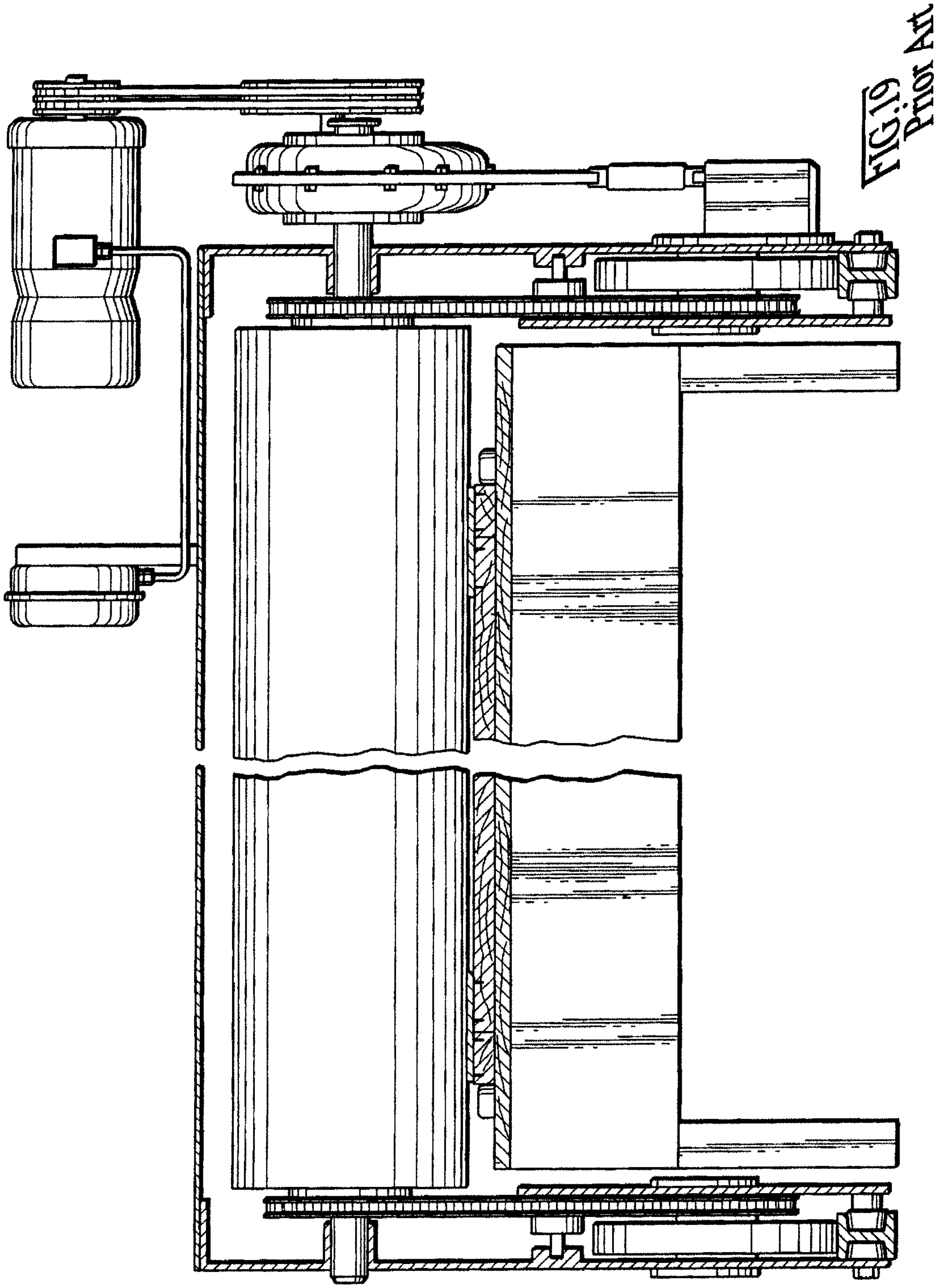
FIG.19 Prior Art
Figure 20:
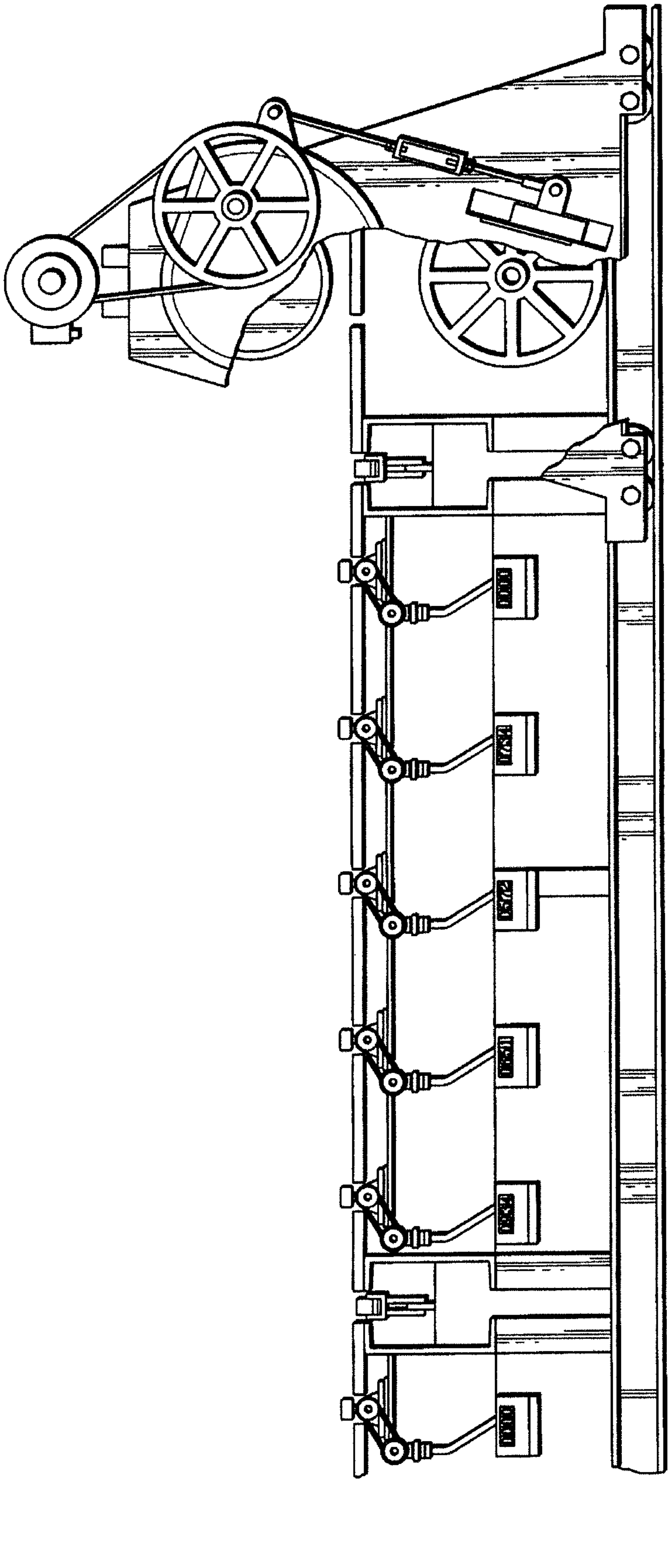
FIG.20 Prior Art
Figure 21:
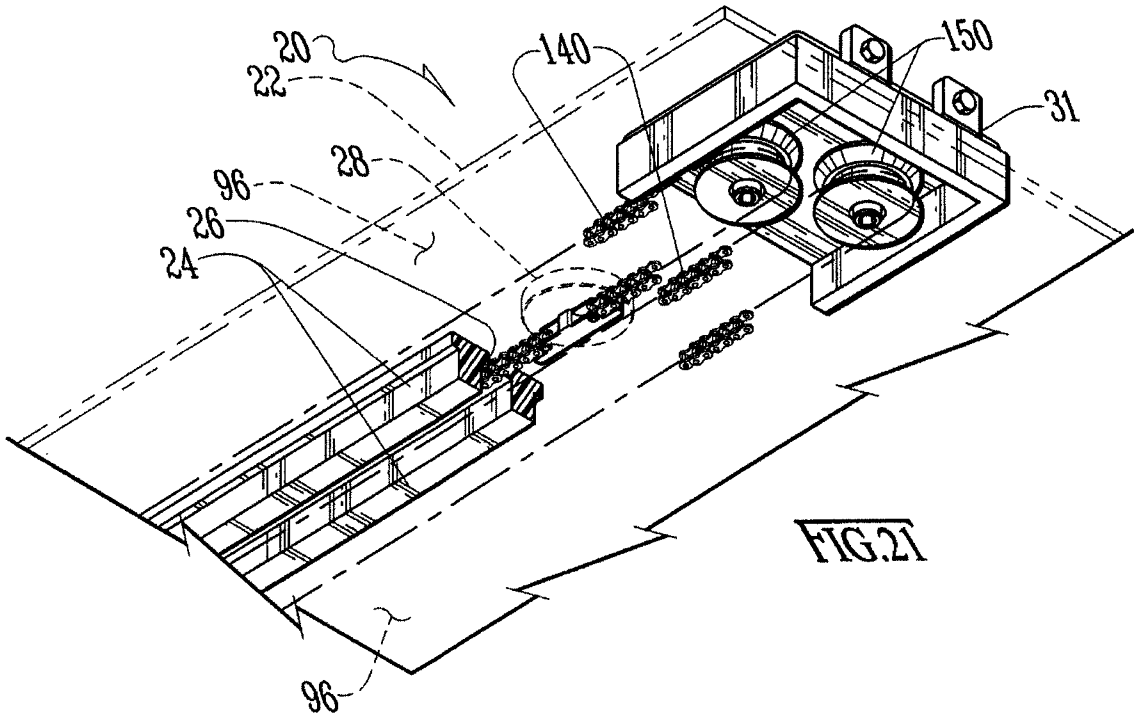
Figure 22:
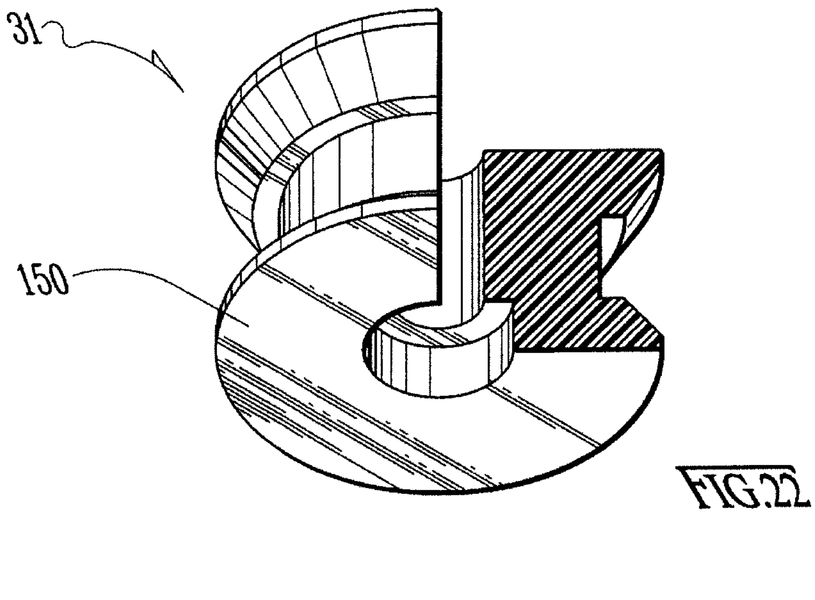
Figure 23:
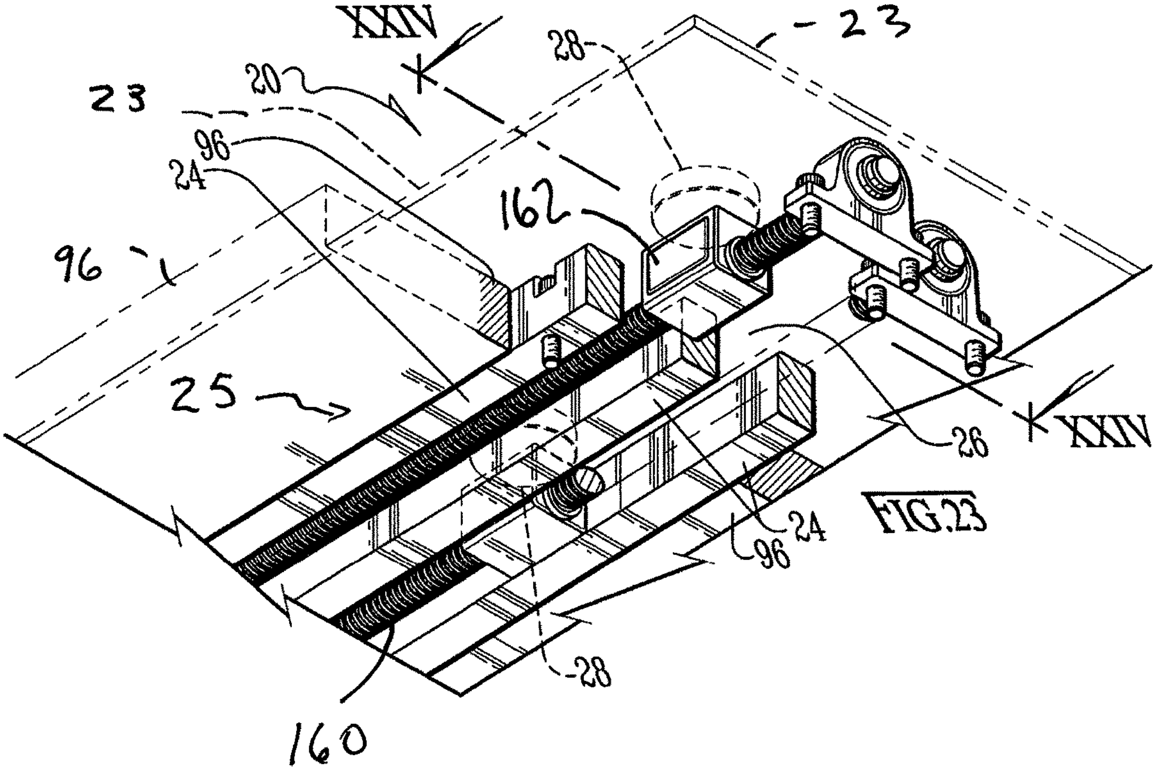
Figure 24:
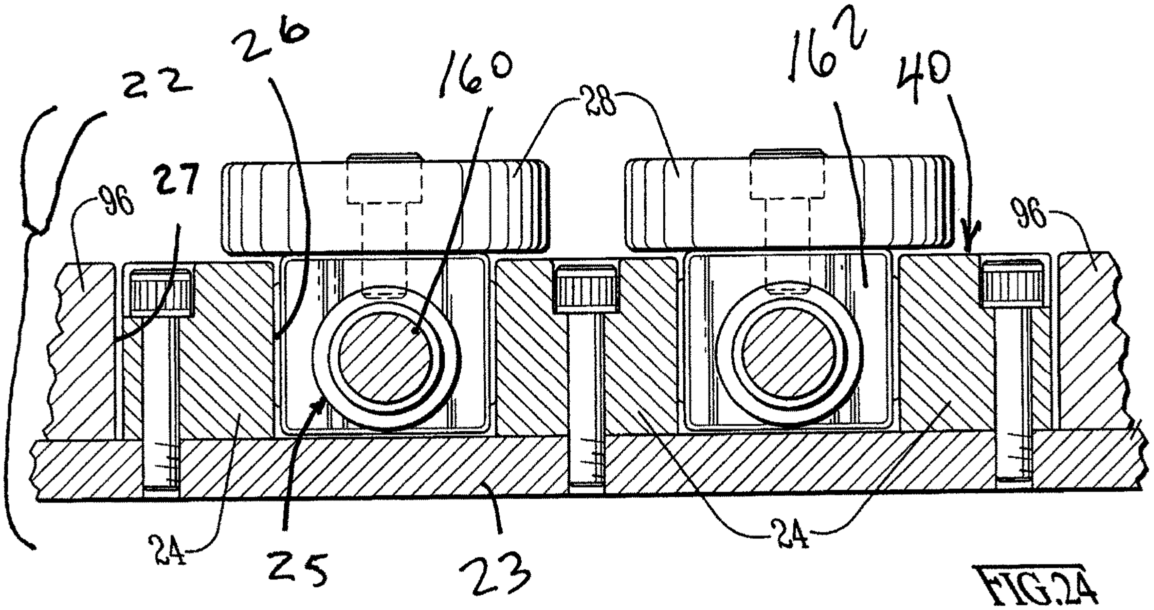
Figure 25:
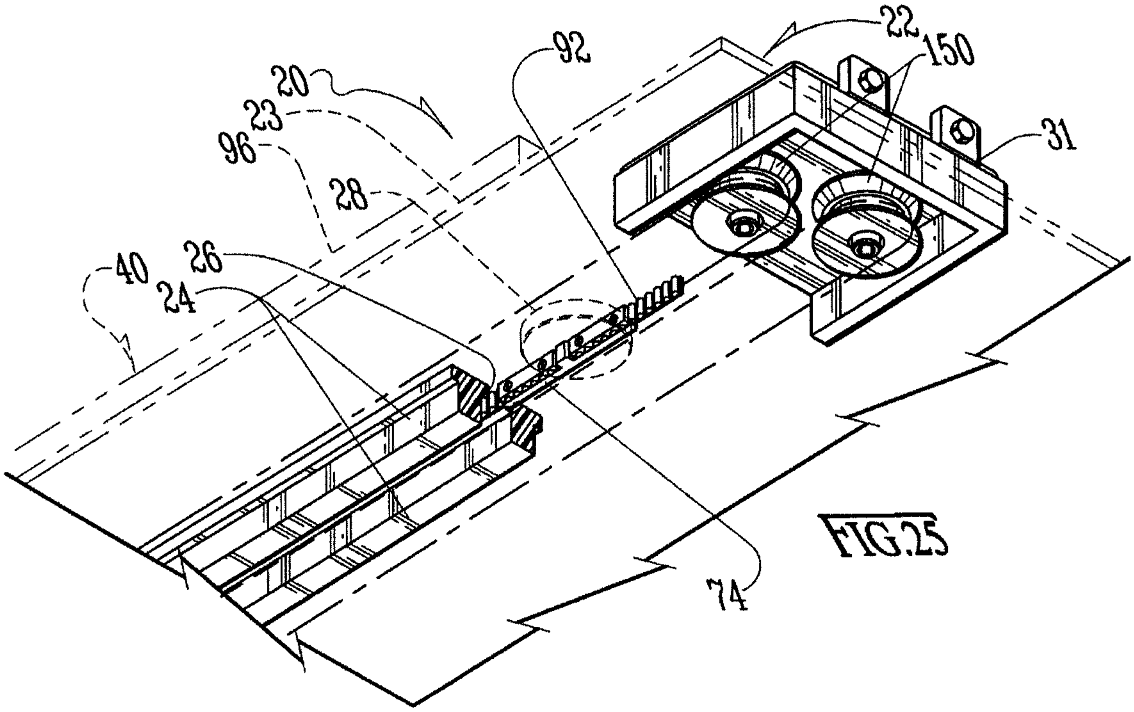
Figure 26:
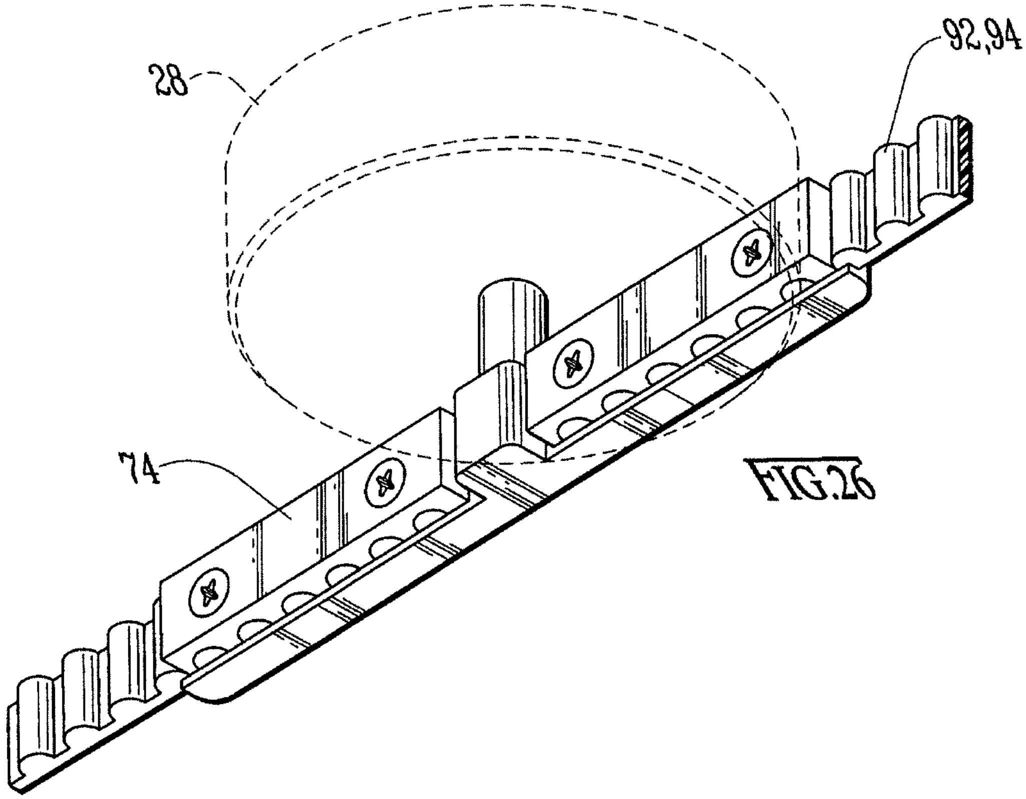
Figure 27:
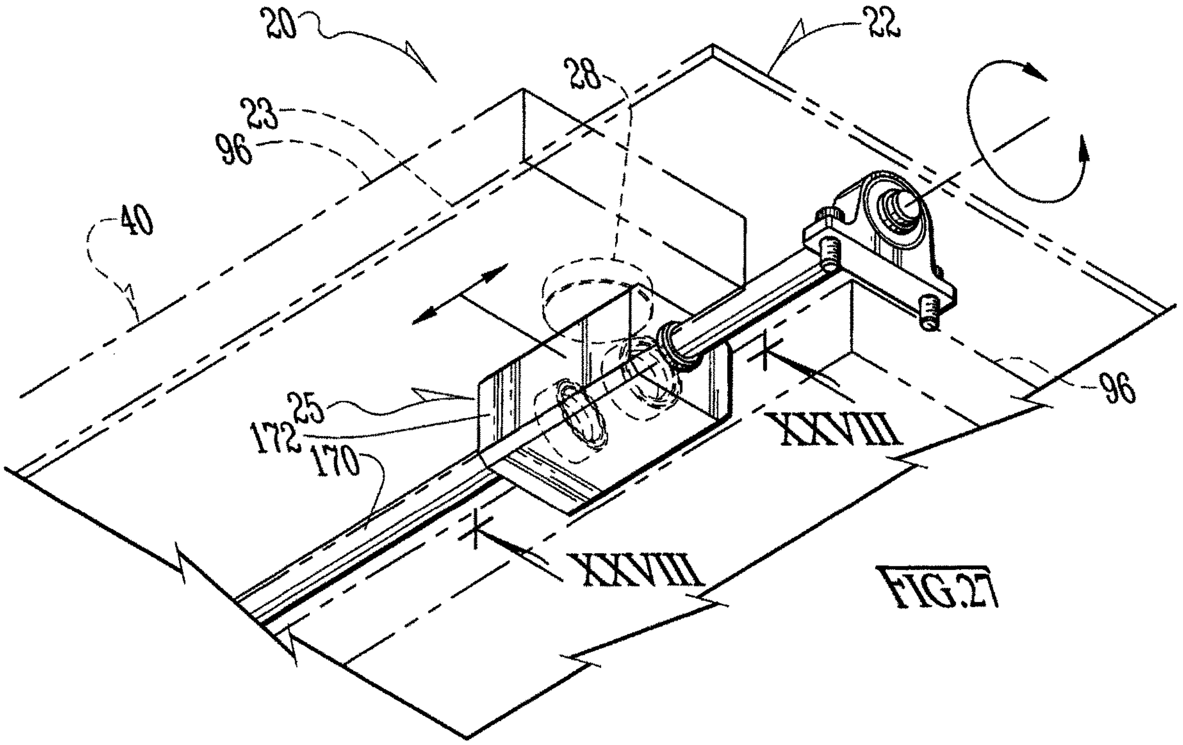
Figure 28:
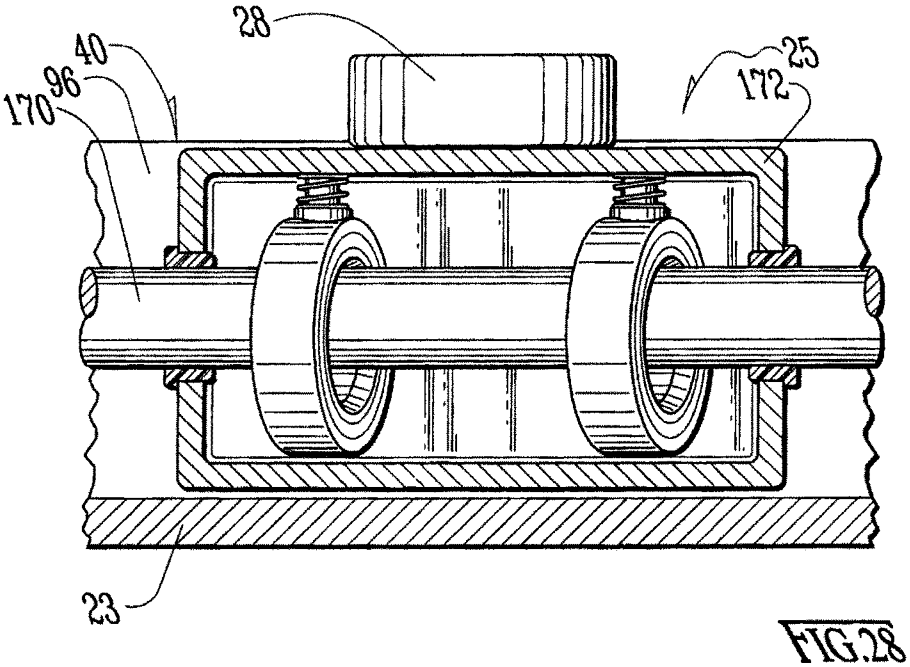
Figure 29:
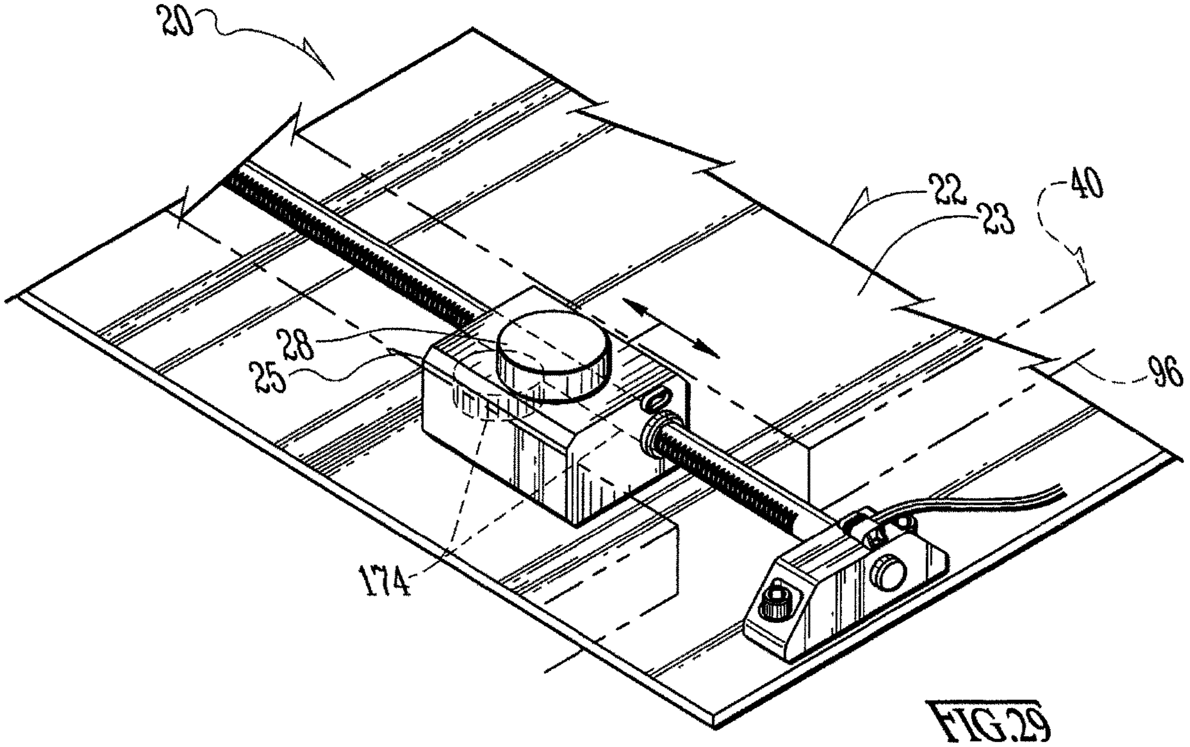

FIG. 18 is a perspective view comparable to FIG. 3A, except showing that the flexible non-metal belts for the various drive systems hereof can readily substituted by a metal link roller chain (eg., a bike chain or timing chain and the like);

FIG. 19 is a left side elevation view of a roller-style truss fabricating machine in accordance with the prior art, adapted from FIG. 14 in U.S. Pat. No. 4,943,038—Harden;

FIG. 20 is a reduced-scale front elevation view of FIG. 19 above, and adapted from FIG. 2 in U.S. Pat. No. 4,943,038—Harden;

FIG. 21 is a perspective view comparable to FIG. 1B and more particularly of certain detail encompassing a wider radius extending further outward from the circle indicated as detail VIIA-VIIA in FIG. 1B, and further except that this FIG. 21 is (1) a bottom perspective view rather than an overhead perspective wherein the lower support deck as well as spaced flanking infill sections are indicated in hidden line, (2) on an enlarged scale, (3) showing a chain drive instead of a belt and drive, and (4) showing a chain drive return which is not a rotatable idler sprocket but a static rub surface;

FIG. 22 is an enlarged scale perspective view of one such static rub surface in FIG. 21 shown in isolation and partly in section;

FIG. 23 is a bottom perspective view comparable to FIG. 21 wherein again the lower support deck as well as spaced flanking infill sections are indicated in hidden line, and except this FIG. 23 is showing a linear (puck-driving) drive system comprising of reversibly (clockwise/counter-clockwise) turning threaded drive rods coupled with respective internally-threaded carriages;

FIG. 24 is an enlarged-scale section view taken along line XXIV-XXIV in FIG. 23;

FIG. 25 is a bottom perspective view comparable to FIG. 23 wherein again the lower support deck as well as spaced flanking infill sections are indicated in hidden line, and except this FIG. 25 is showing a linear (puck-driving) drive system comprising of toothed drive belts and further showing the return provisions comprising static rub surfaces as shown in FIGS. 21 and 22;

FIG. 26 is an enlarged-scale bottom perspective view of the carriage in FIG. 25 and corresponding to the carriage shown in (among other views) FIG. 13, except this FIG. 26 is further showing how the carriage serves as a splice for the tag ends of the drive belt (which drive belt is omitted in FIG. 13);

FIG. 27 is a bottom perspective view comparable to FIG. 23 wherein again the lower support deck as well as spaced flanking infill sections are indicated in hidden line, and except this FIG. 27 is showing a linear (puck-driving) drive system comprising of a reversibly (clockwise/counter-clockwise) turning smooth-walled drive rods coupled with respective carriages that incorporate linear drive nut technology as shown by, for example and without limitation, U.S. Pat. No. 2,940,322—Uhing, the disclosure of which is incorporated herein by this reference thereto;

FIG. 28 is an enlarged-scale section view taken along line XXVIII-XXVII in FIG. 27; and FIG. 29 is a bottom perspective view comparable to FIG. 27 except the lower support deck is shown in solid line the flanking infill sections are removed from view, wherein this FIG. 29 is showing a linear (puck-driving) drive system comprising a rack-and-pinion drive.

DETAILED DESCRIPTION OF THE PREFERRED EMBODIMENTS

FIGS. 1A through 2B show a truss jigging system 20 in accordance with the invention. The truss jigging system comprises an elongated table 22 constructed of composite pieces.

Figure 17:
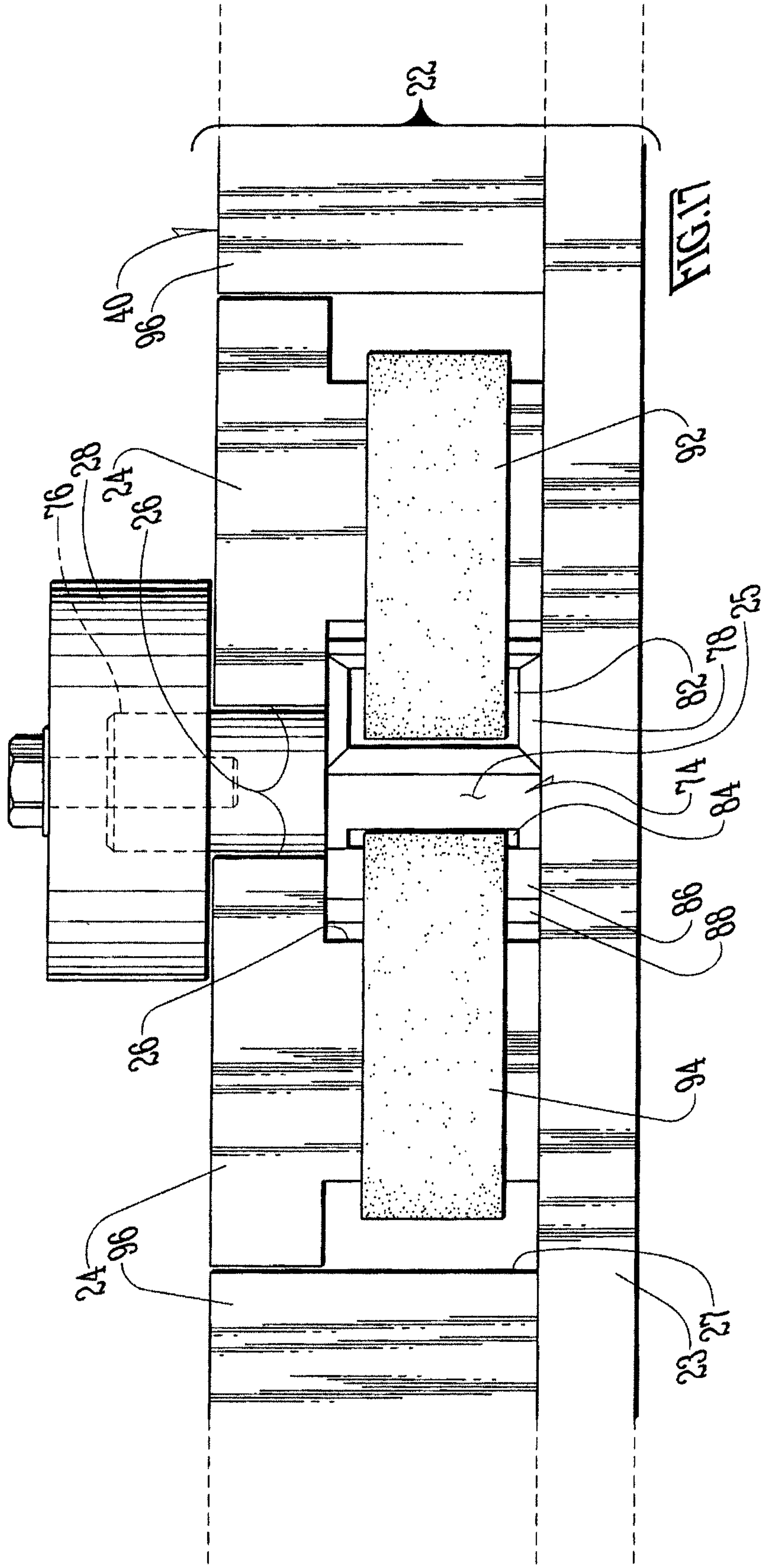
FIG. 17 is an idler-side elevational view of either the FIG. 1A or 1B combined idler system and tensioning system, except:— that not only the idler system and tensioning system but also a cover therefor have been removed from view to reveal how the carriage and locating pin occupy an inverted-T shaped slot defined by a pair of the T-shaped jigging bars as better shown by FIGS. 11 and 12, showing better how the counter-wound endless drive belts (or chains if chains are used) are rigged as well, showing better how locating puck is mounted on the locating pin above the plane of the top surfaces of the T-shaped jigging bars, and additionally showing a pair of infill plates fastened or affixed to the table surface flanking the pair of T-shaped jigging bars, and creating a work surface flush with the elevation of the plane of the top surfaces of the T-shaped jigging bars.

As shown better in FIGS. 17 and 24 (among other figures), the composite table 22 has an underlying lower support deck 23 that comprises plate steel stock about a half inch thick. The lower support deck 23 supports spaced parallel arranged infill sections 96. The spacing between the infill sections 96 define interspaces 27. The slots 26 allow the installation of various embodiments of linear drive systems 25 (as more particularly described below) as well as various embodiments of jigging bars 24.

In FIG. 17, parallel pairs of jigging bars 24 installed in a single interspace 27 (which parallel jigging bars are of the embodiment shown FIG. 11) define a single slot 26 therebetween and in each slot 26 a pair of puck-carrying carriages (see, eg., carriages 74 in any of FIGS. 13-17) are confined to traverse independently of each other, back and forth over the same the slot 26, each puck-carrying carriage (eg., 74) carrying a puck 28 in a linear path back and forth in the front to back direction.

By way of background, applicant hereof is successor-in-interest to the business built around the Eberle-style of a "Truss Fabricating Machine," as disclosed in part by U.S. Pat. No. 3,826,188 by George F. Eberle. A more appropriated descriptive name of an Eberle-style "Truss Fabricating Machine" might be an 'X-Y scrolling vertical press style' of a truss fabricating machine. The foregoing patent disclosure of the Eberle patent is likewise fully incorporated herein by this reference thereto.

Figure 1C:
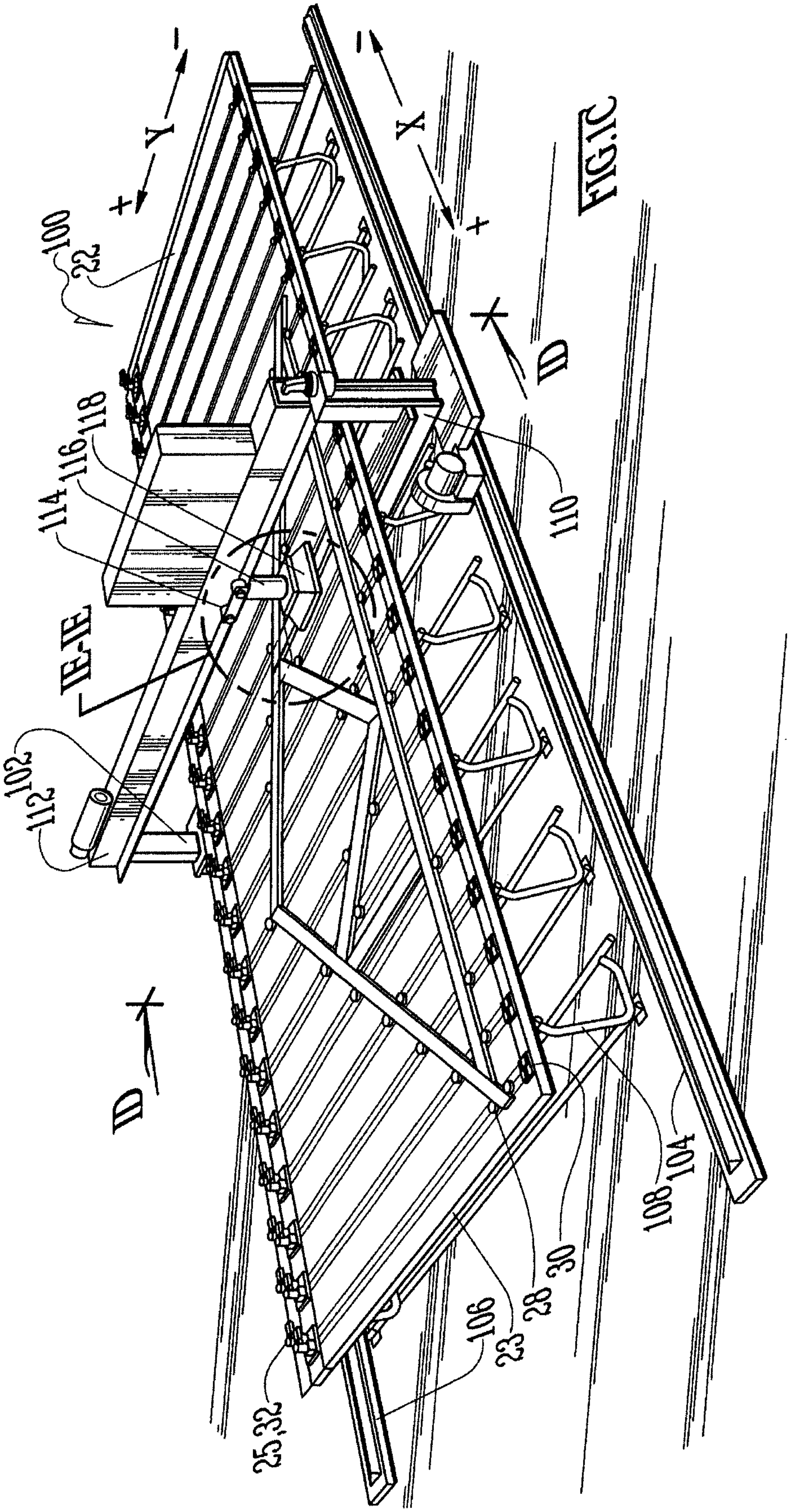
FIG. 1C is a perspective view comparable to FIGS. 1A and 1B, except on a reduced scale and showing more of the structure of the truss jigging system in accordance with the invention characteristically associated with an 'X-Y scrolling vertical press style' of a truss fabricating machine.
Figure 1D:
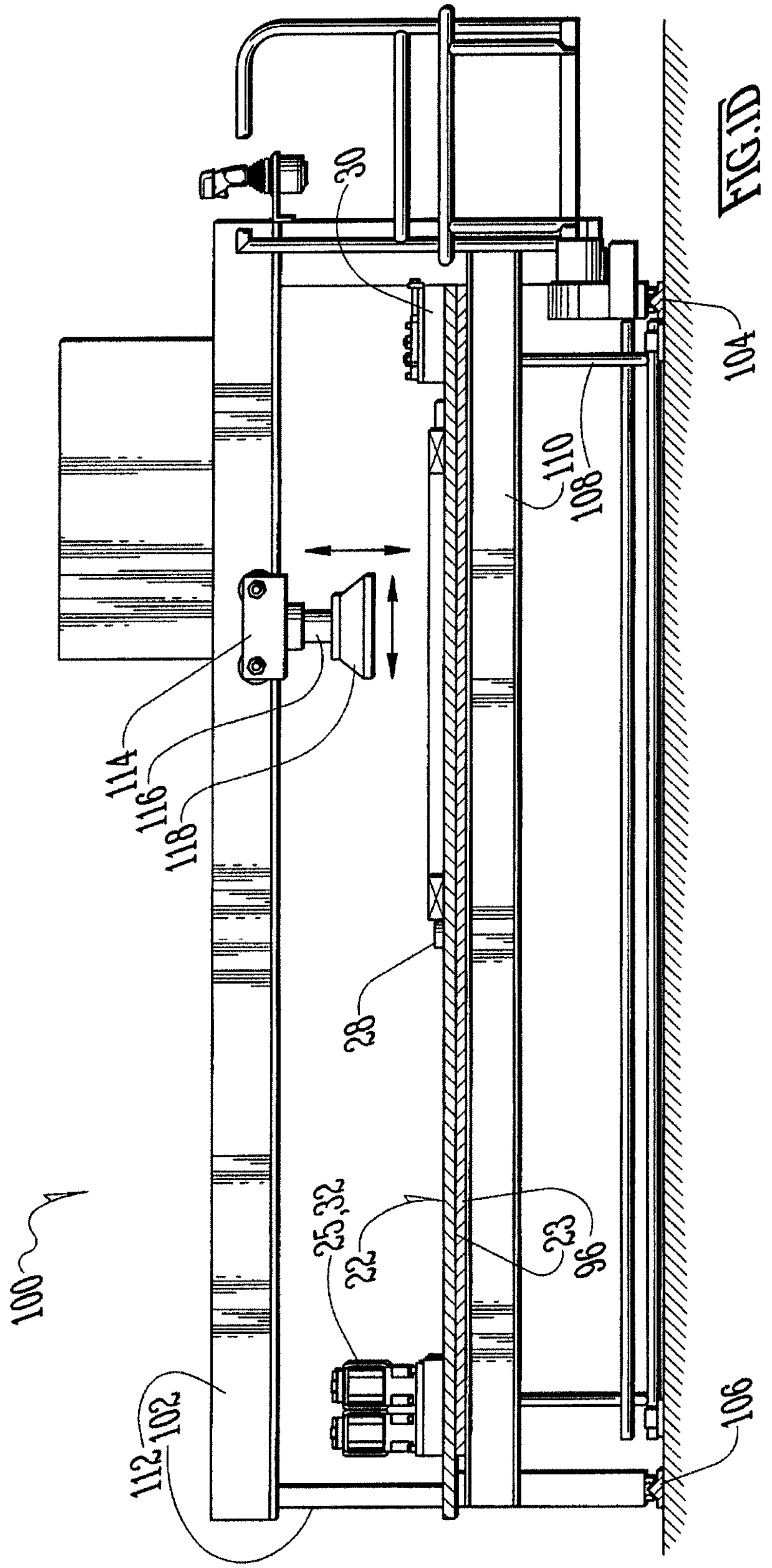
FIG. 1D is an enlarged-scale sectional view taken along line ID-ID in FIG. 1C.
Figure 1E:
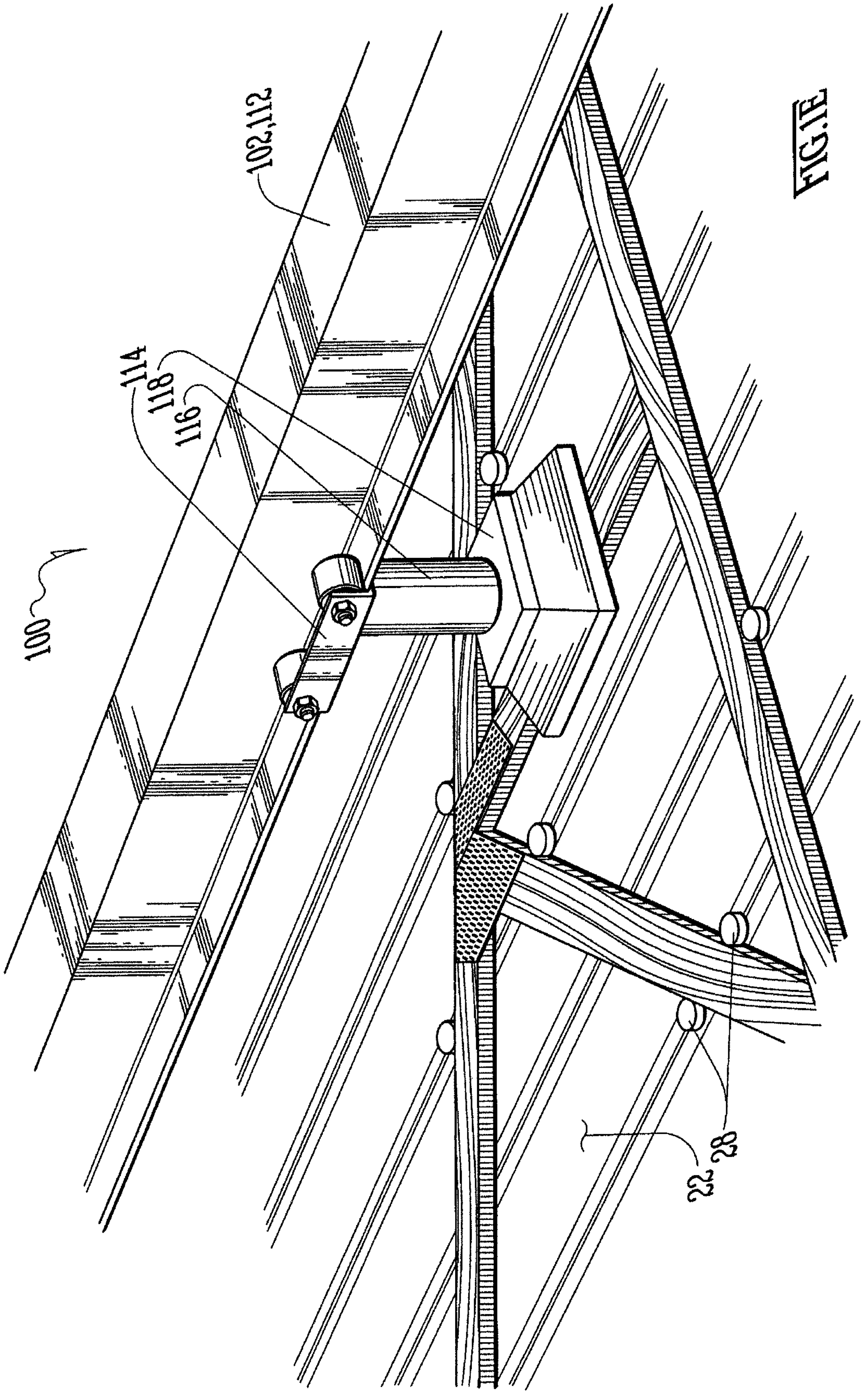
FIG. 1E is an enlarged-scale perspective view of detail IE-IE in FIG. 1C.

Referring generally to FIGS. 1C through 1E, an 'X-Y scrolling vertical press style' truss fabricating machine 100 has a heavy, rectangular-frame gantry 102 translating left and right across the ground plane with the laterally-elongated stationary jigging table 22 extending through the window-opening of the heavy, rectangular-frame gantry.

Preferably the heavy, rectangular-frame gantry rides on rails 104 and 106, at least one rail 104 in the foreground (ie., proximate the 'near' side of the jigging table 22 where the workers usually work) and the other rail 106 one in the background (ie., proximate the 'far' side of the jigging table 22, which can be up against a wall as ready access thereto is only seldomly needed).

The jigging table 22 is supported by a plurality of relatively lightly-constructed, hurdle-like tubular-frame rocking legs 108. Each leg 108 has a front and rear U-shaped frame which are connected spaced apart by at least three elongated cross tubes. One cross tube defines the rocking axis and connects the front and rear U-shaped frames by the lower-vertices thereof. This rocking axis cross-tube is stationed in one position on the floor by at least a spaced pair of a front and rear hub which, while confining the rocking axis cross-tube to be coincident with a stationary axis, allows the rocking-axis cross-tube to rock between clockwise and counterclockwise extremes.

One of the two remaining elongated cross tubes for each leg 108 comprises an extreme clockwise hurdle-bar that extends between the extreme clockwise-ends of the arms of the front and rear U-shaped frames. The other of the two remaining elongated cross tubes for each leg comprises an extreme counterclockwise hurdle-bar that extends between the extreme counterclockwise-ends of the arms of the front and rear U-shaped frames.

As the translating gantry 102 moves left to right, it plows through the plurality of hurdle-like rocking legs 108. When viewed from the front of the truss fabricating machine 100 (eg., FIG. 1C), all legs 108 to the left of the gantry will be rocked to their clockwise extremes. All legs 108 to the left of the gantry 102 will be rocked to their counter clockwise extremes.

For each leg 108 to the left of the gantry 102 and which are rocked to their clockwise extremes, their counterclockwise hurdle bar will have been rocked to an over-center position with respect to the respective rocking-axis cross-tube, and will be propping up the jigging table 22 from direct contact underneath the lower support deck 23. The arms extending to the counterpart clockwise hurdle bar (or even the clockwise hurdle bar itself) will be prone on the floor. Hence more downward pressure on the jigging table 22 and hence upon the legs 108 just makes legs 108 more stable in the over-center position and relatively unyielding to unwanted rocking away from that position.

And the opposite is true for the legs 108 to the right of the gantry 102. That is, the legs 108 to the right of the gantry 102 (eg., FIG. 1C) are all rocked to their counterclockwise extreme, and their clockwise hurdle bar will have been rocked to an over-center position with respect to the respective rocking-axis cross-tube, and will be propping up the jigging table 22 from direct contact underneath (eg., direct contact against the bottom surface of the lower support deck 23). The arms extending to the counterpart counterclockwise hurdle bar (or even the counterclockwise hurdle bar itself) will be prone on the floor. Hence more downward pressure on the jigging table 22 and hence upon the legs just makes the legs 108 more stable in the over-center position and relatively unyielding to unwanted rocking away from that position.

Of course, when the gantry 102 plows through any of the legs, the gantry 102 toggles the legs 108 to their opposite extreme over-center position with no problem.

The gantry 102 has a heavy lower crossbeam 110 and a comparably heavy upper crossbeam 112 supported by spaced front and rear upright beams which ride on the front and rear rails 104 and 106 respectively. The heavy lower crossbeam 110 is provided with left and right bumpers to toggle over the legs without damaging the legs. The heavy lower crossbeam 110 also skims the undersurface of the jigging table 22. More accurately, the heavy lower crossbeam 110 skims or scrapes the bottom surface of the lower support 23, which bottom surface is generally smooth.

The jigging table 22 itself, like the legs 108, is also relatively lightly constructed. The upper crossbeam 112 of the gantry 102 is spaced substantially generously above the upper plane 40 of the jigging table 22. That way, the upper crossbeam 112 provides headspace or airspace above the upper plane 40 of the jigging table 22 to allow for the front-to-rear traverse of a suspended carriage 114 which carries an inverted hydraulic press 116 where the lower extremity thereof—a platen 118—can apply a powerful, crushing downward pressure to the upper surface 40 of the jigging table 22. Albeit the jigging table 22 is relatively lightly constructed, the jigging table 22 is just as powerfully propped upward by the heavy lower crossbeam 110 to counter against the powerful downward stroke of the hydraulically-press 116 driven platen 118.

The stroke of the platen 118 can be driven by other drive sources, but hydraulics has remained popular to date.

Given the foregoing, the X-Y movement (scrolling) of the platen 118 is provided by the translating gantry 102 providing the movement along an X-axis and the traversing carriage 114 providing movement along a Y-axis. In that way, the platen 118 can be located over intersection of lumber pieces laid upon the jigging table 22 in a selected truss configuration, to a supply powerful vertical down-stroke to drive in the truss connection plates that lie above and below the intersection of meeting lumber pieces.

Given the foregoing, the 'X-Y scrolling vertical press style' truss fabricating machine 100 described above in connection with FIGS. 1C through 1E contrasts quite distinctly from another popular style in the prior art.

Namely, this other popular style in the prior art is shown by FIGS. 19 and 20, comprising a roller-style truss fabricating machine in accordance with the prior art, which FIGS. 19 and 20 are adapted from FIGS. 14 and 2 respectively in U.S. Pat. No. 4,943,038—Harden. In a roller-style truss fabricating machine, a giant heavy rolling pin translates left to right across the tops of the lumber pieces and the pre-laid out truss connector plates. The roller-style jigging table, rather than being lightly constructed, is powerfully sturdy. But this achieved, not by lightly constructed rocking hurdle-like legs, but by a heavy stand characterized by powerful pedestal-like legs.

To now return to the jigging by the pucks 28, each of the pair of pucks 28 carried by carriage gear (see, eg., reference numeral 74 in any of FIGS. 13 through 17) the same slot 26 can traverse that slot 26 independently of each other, but the carriages 74 (and hence the pucks 28) cannot pass one another. Accordingly, the pucks 28 can define a spacing between each other. The pucks 28 comprise the work contacting elements of the truss jigging system 20.

Each parallel pair of jigging bars 24 has a front end (near edge of the table 22 from a worker's perspective) which is where—as shown in FIGS. 1A-2B, 7A and 8-10—a belt return provision 31 and tensioning system 30. In contrast, FIGS. 7, 21 and 25 shows a return provision system 31 without the tensioning function. FIG. 7 shows a return provision 31 comprising a toothed idler wheel or pulley 52.

The opposite ends of each parallel pair of jigging bars 24 terminate proximate a drive-side edge (eg., back or far edge from a worker's perspective) of the jigging table 22 at a drive system 32 in FIGS. 1A-3A, 4A and 5-6. In contrast, FIGS. 3B and 4B an alternate embodiment of a drive system 33 comprising a combined drive system and tensioning system for lining up on the opposite ends of the T-shaped jigging bars 24 as the FIG. 7B flush return provision 31, comprising a toothed idler wheel 52 alone.

Typically, a line of the pucks 28 for each slot 26 that are closest the drive system 32 or 33 and coursing on a diagonal slant would contact a rafter (or, top chord, and not shown). Correspondingly, the line of pucks 28 for each slot 26 closest to the return provision 31 would contact a tie beam (or, bottom chord, and not shown). Often, this line of pucks 28 for each slot 26 that are closest to the return provision 31 are also typically parallel with the front edge of the jigging table 22.

Preferably the lower support deck 23 comprises plate steel stock about a half inch thick. The extent between the front edge and drive-side edge (eg., rear edge) is preferably in the range of twelve to sixteen feet (~3½ m and ~5 m). The extent between a right (near side in FIGS. 1 and 2) and left edge is preferably anywhere from eighty to one-hundred feet (~24 m to ~30 m). The jigging table 22 is more or less coterminous with the lower support deck 23, and is shown greatly abbreviated in FIGS. 1A through 2B in order to allow better illustration of the jigging bars 24, tensioning systems 30 or return provision 31, and the embodiments of linear drive systems 25 shown therein, namely drive systems 32 or 33.

Preferably the distance between centers of two adjacent slots 26 is about two feet (or about ~0.6 m). The width of the interspaces 27 between adjacent infill sections 96 is preferably about 5¾ inches (~15 cm). Hence each neighboring set of parallel jigging bars 24 leaves a swath on the table deck 22 that is about eighteen inches (~45 cm) or so wide. These swaths are in-filled with infill sections 96 (see FIG. 17). These infill sections 96 typically comprise particle board covered by plastic to create more or less a uniform surface (containing plane 40 of working surface) for truss components to be arranged upon (not shown), and which corresponds to top elevation of the jigging bars 24.

It can be appreciated now that, a hundred-foot wide truss jigging system 20 is going to forty-nine slots 26, and, ninety-eight drive systems 32 or 33.

Figure 7A:
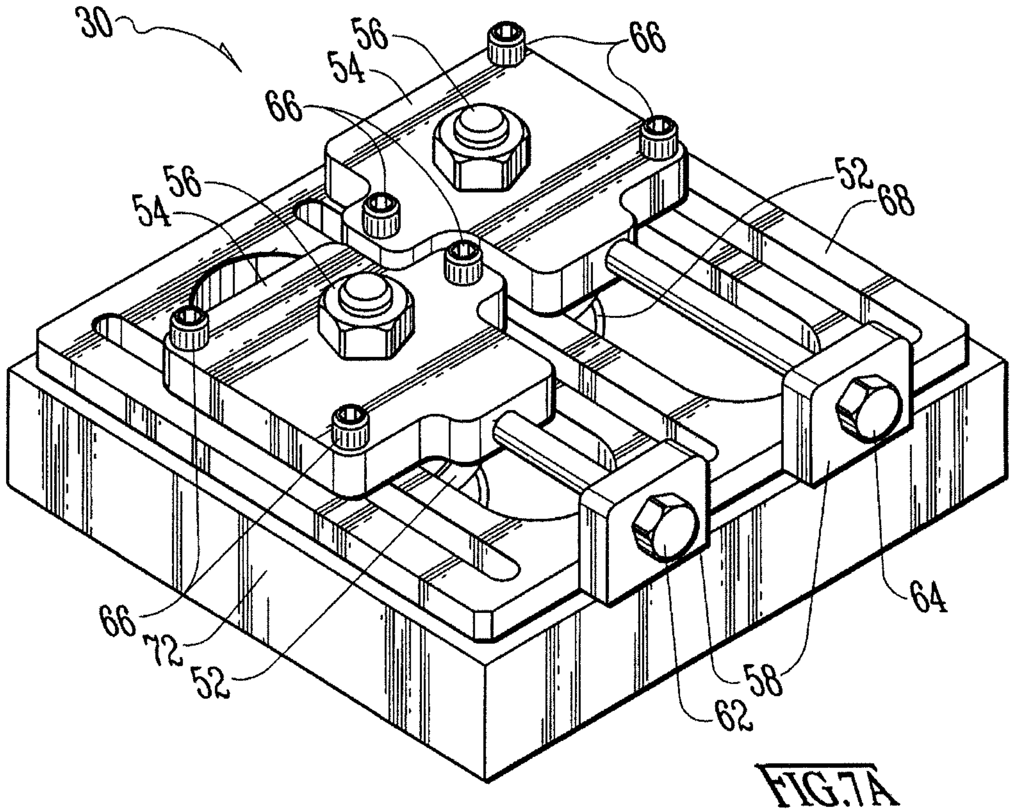
FIG. 7A is an enlarged scale perspective view of detail VIIA-VIIA in FIG. 1B, comprising an idler system and tensioning system.
Figure 7B:
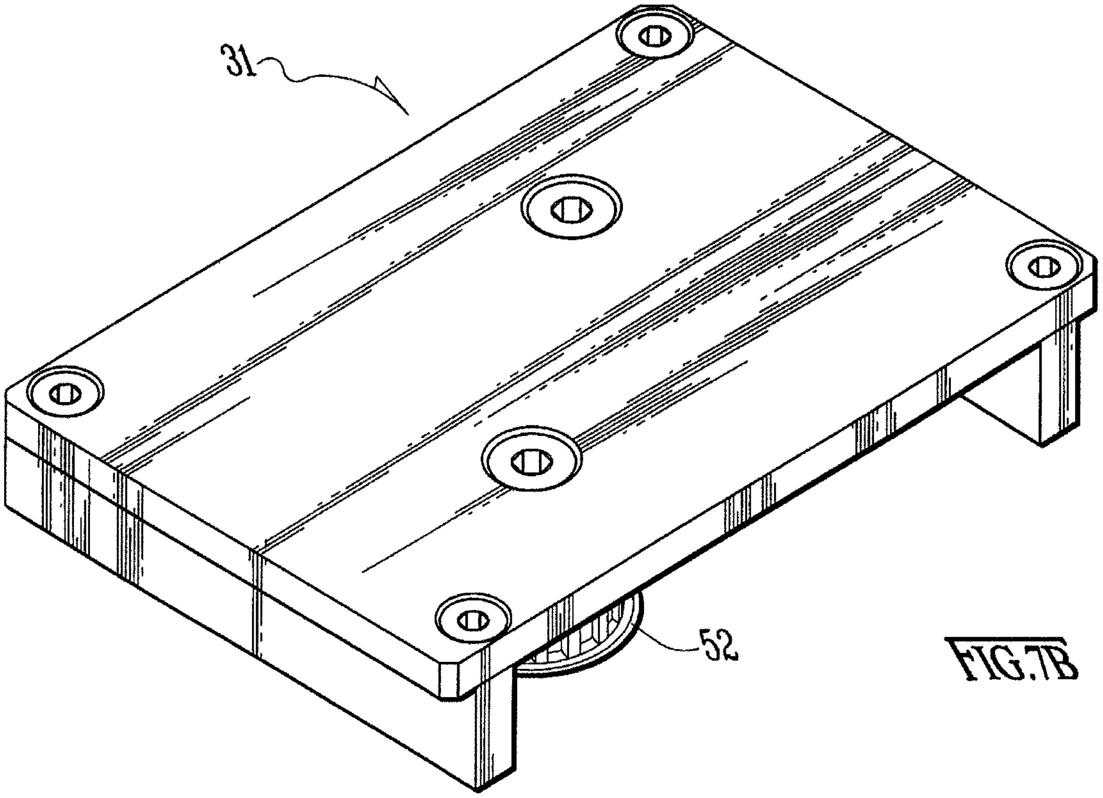
FIG. 7B is an enlarged scale perspective view comparable to FIG. 7B except showing a flush mount idler system, comprising an idler system alone, and for lining up opposite the combined drive system and tensioning system of FIGS. 3B and 4B.
Figure 8:
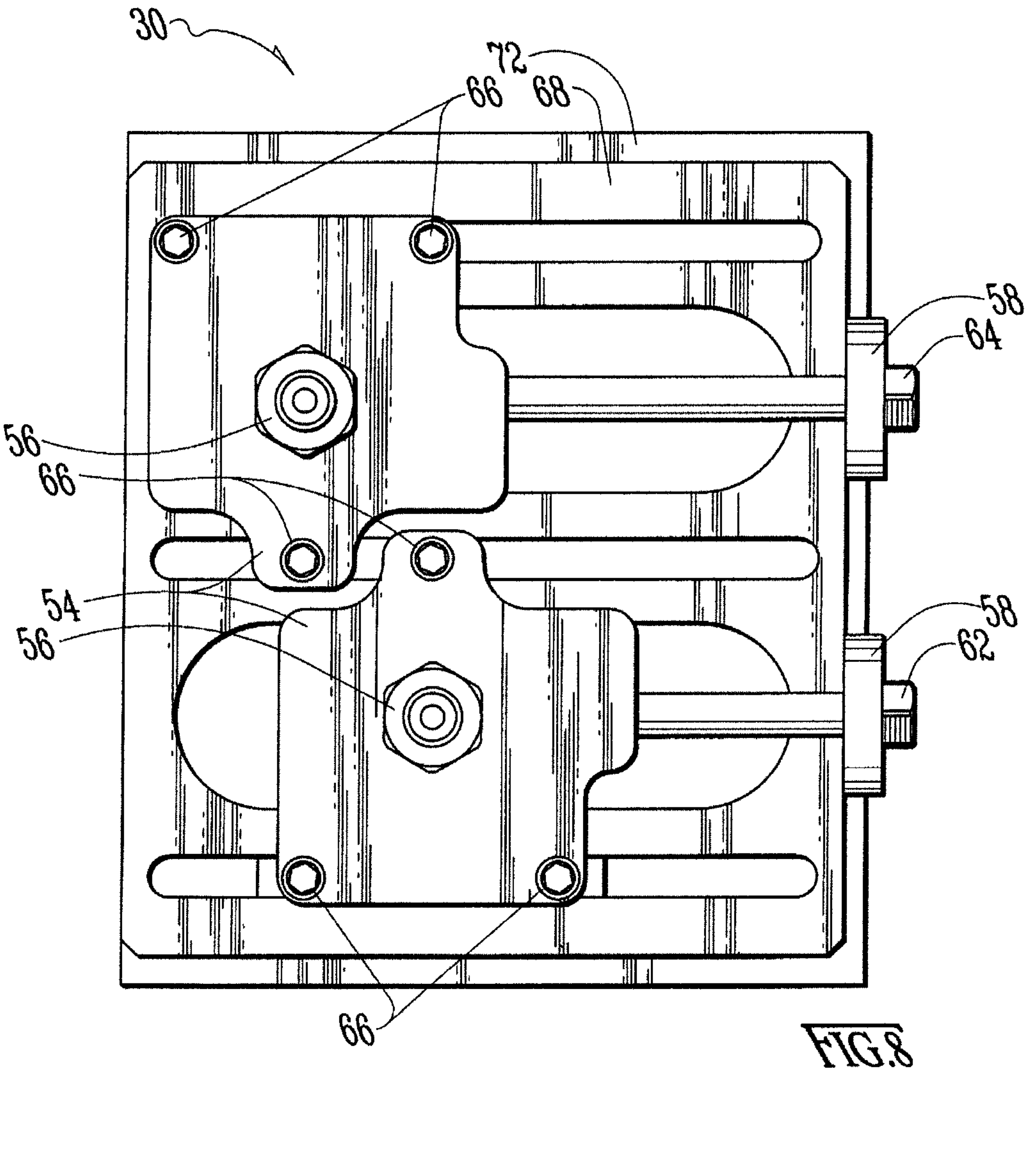
FIG. 8 is a top plan view of FIG. 7A.
Figure 9:
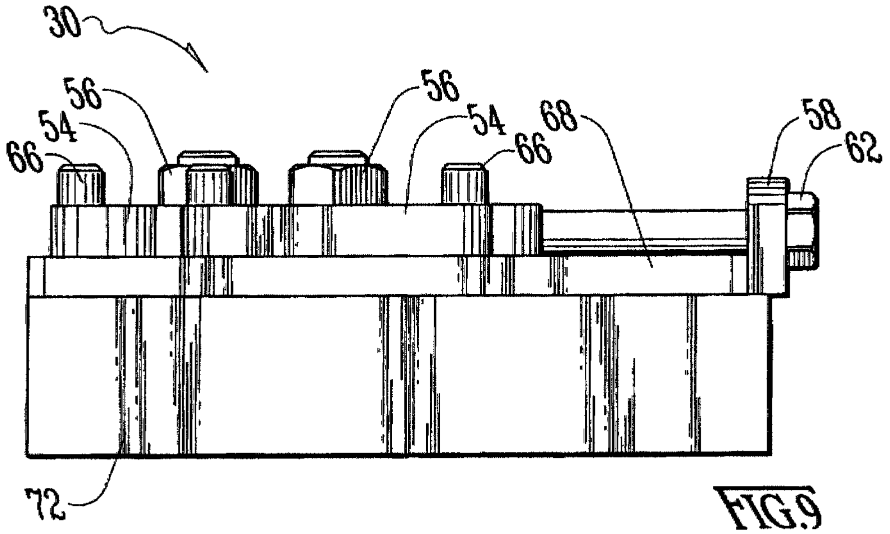
FIG. 9 is a left side elevational view of FIG. 7A.
Figure 10:
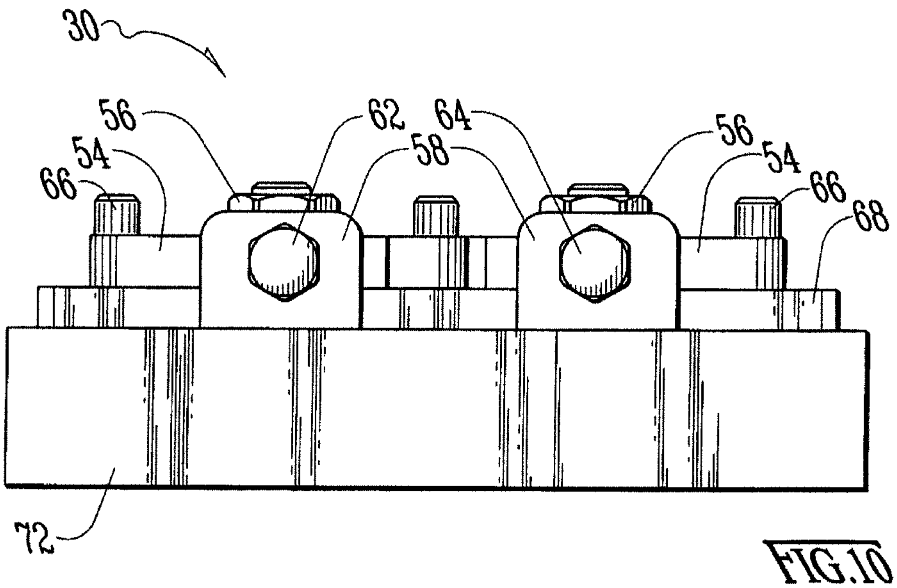
FIG. 10 is an end (front) elevational view of FIG. 7A of the outboard edge.

FIG. 7B shows better that the return provision 31 is mounted on table deck 22 (not shown in FIG. 7B) by flush mounting bolts. This provides a flush mount for this return provision 31. This clears the airspace above the front edge of the truss jigging system 20 in order to allow both truss stock and a completed truss to be slid smoothly on and off over the return provision 31.

FIGS. 3A through 6 show better several aspects of the drive system 32 or 33. Drive system 32 comprises a pair of stepping motors 34, each driving a respective right angle gear 36, the output of which is one or the other of a pair of drive pulleys 38 for driving toothed belts (see, eg., reference numerals 92 and/or 94 in FIG. 17). These toothed belts correspond to or are at least comparable to timing belts. FIG. 18 is a perspective view comparable to FIG. 3A, except showing that the drive belts for the various drive systems hereof can readily substituted by a metal link roller chain 140 (eg., a bike chain or timing chain and the like). The drive systems 32 and/or 33 are supported off the table deck 22 by means of a C-shaped frame 42 and mounting plate 44 joined by fasteners 46.

FIGS. 7A, and, 8 through 10 show better several aspects of a tensioning system 30 (the return provisions 31 are hidden from view).

The term 'return provision(s)' as used in this disclosure include(s) without limitation any of static rub surfaces or passive rolling idler provisions including sprockets, toothed rollers, wheels or pulleys as well as toothless rollers, wheels or pulleys, and so on.

The return provision 31 (hidden from view) and tensioning system 30 as shown in FIGS. 7A, and, 8 through 10 comprises a pair of idler pulleys 52 (see, eg., FIG. 7B) counterpart to the pair of drive pulleys 38 in FIG. 3A for providing for the return of a driven toothed belt (see, eg., reference numerals 92 and/or 94 in FIG. 17) driven by each drive pulley 38 in FIG. 3A. The idler pulleys 52 are mounted underneath respective slide plates 54 by shaft nuts 56. The slide plates 54 are pulled in tension relative fixed tabs 58 by respective (short and long) threaded drive rods 62 and 64. Each slide plate 54 has its own set of locking nuts 66 which, when slack, permit the slide plate 54 to pulled in tension relative the respective fixed tab 58. Tightening the locking nuts 66 fixes the slide plate 54 to a stationary position relative mounting plate 68, which is fixed in common with the tabs 58 by C-shaped frame 72.

Figure 2A:
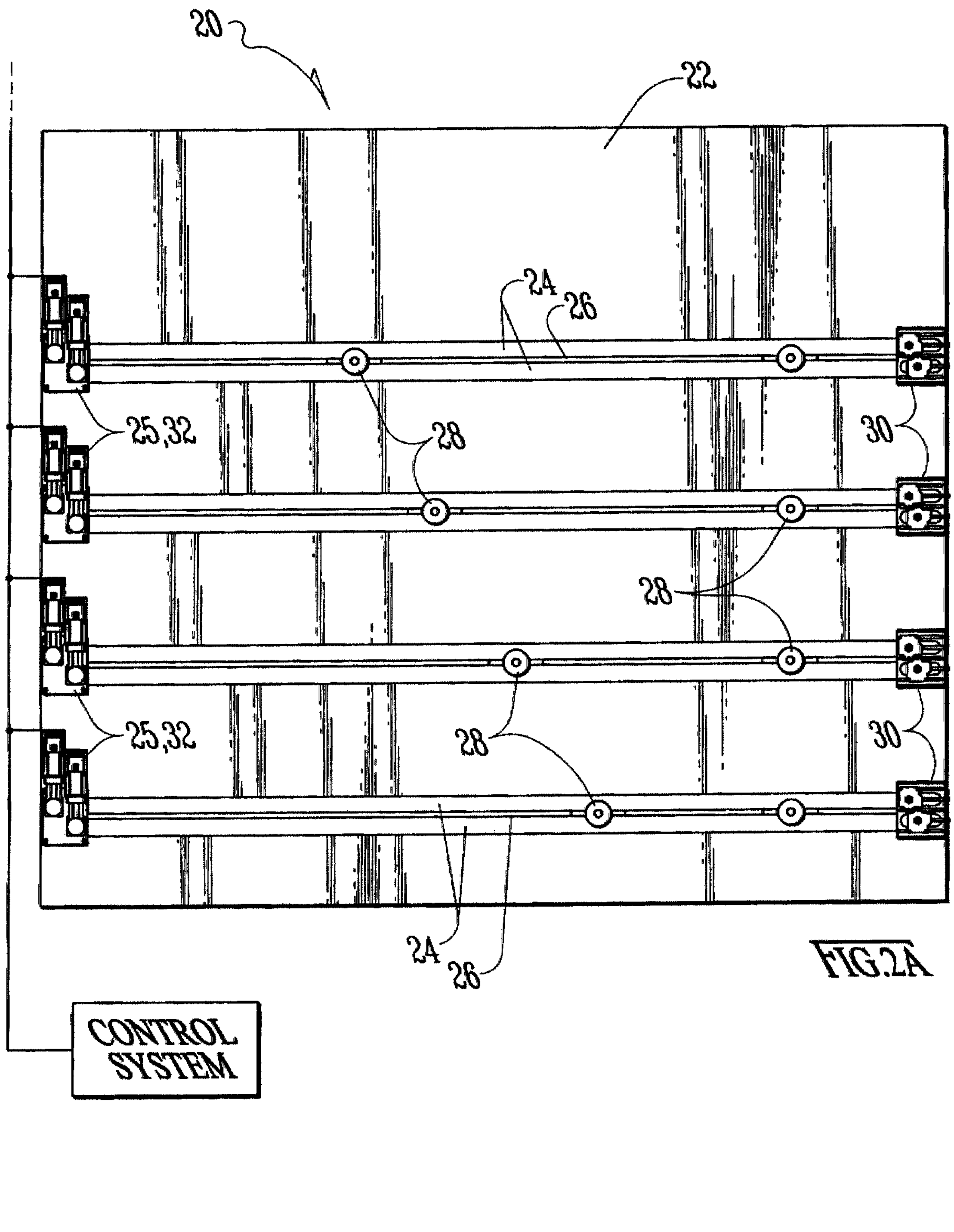
FIG. 2A is a top plan view of FIG. 1A.
Figure 2B:
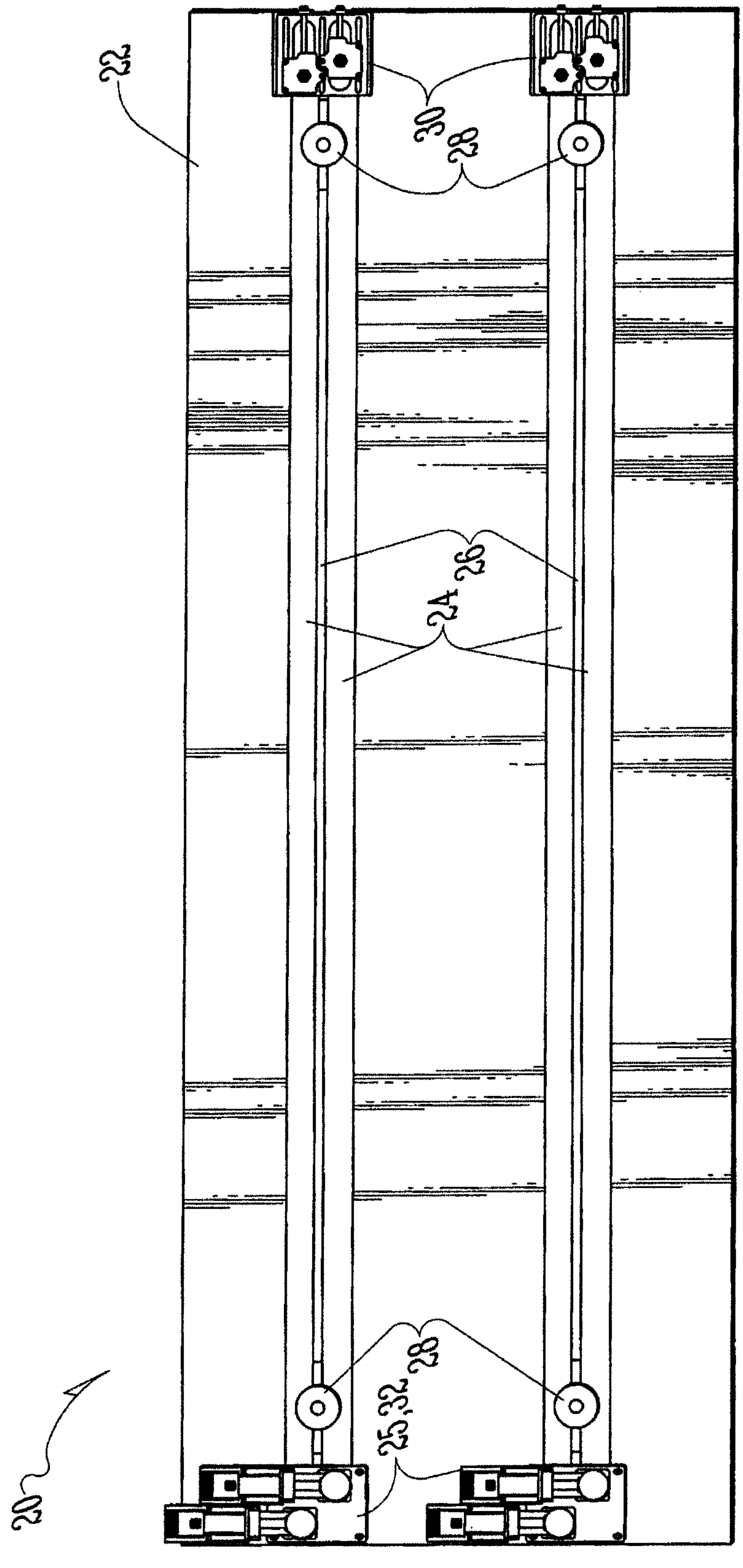
FIG. 2B is a top plan view of FIG. 1B.
Figure 3B:
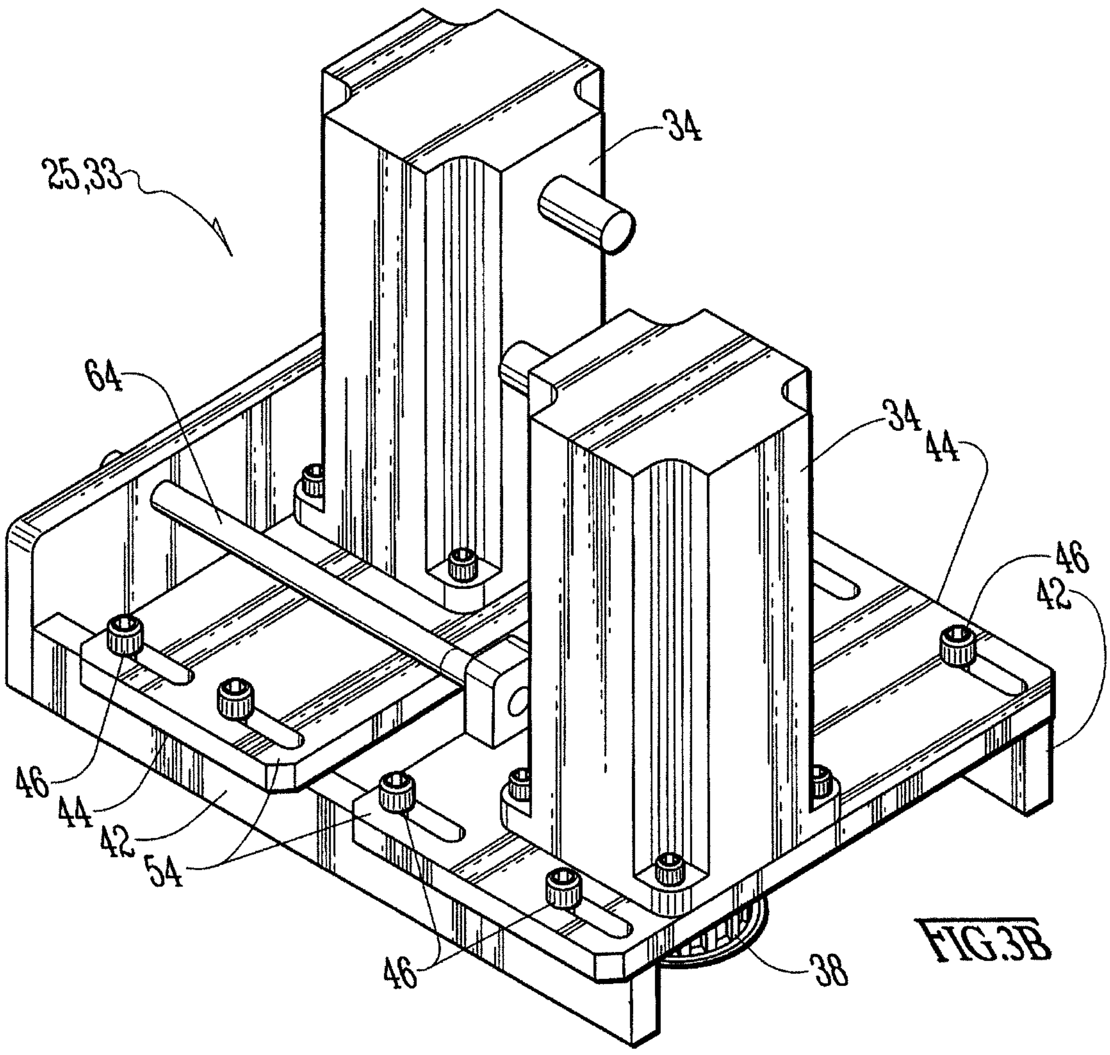
FIG. 3B is a perspective view comparable to FIG. 3A, except of a second embodiment of a drive system in accordance with the invention, comprising not only a drive system but also a tensioning system.
Figure 4A:
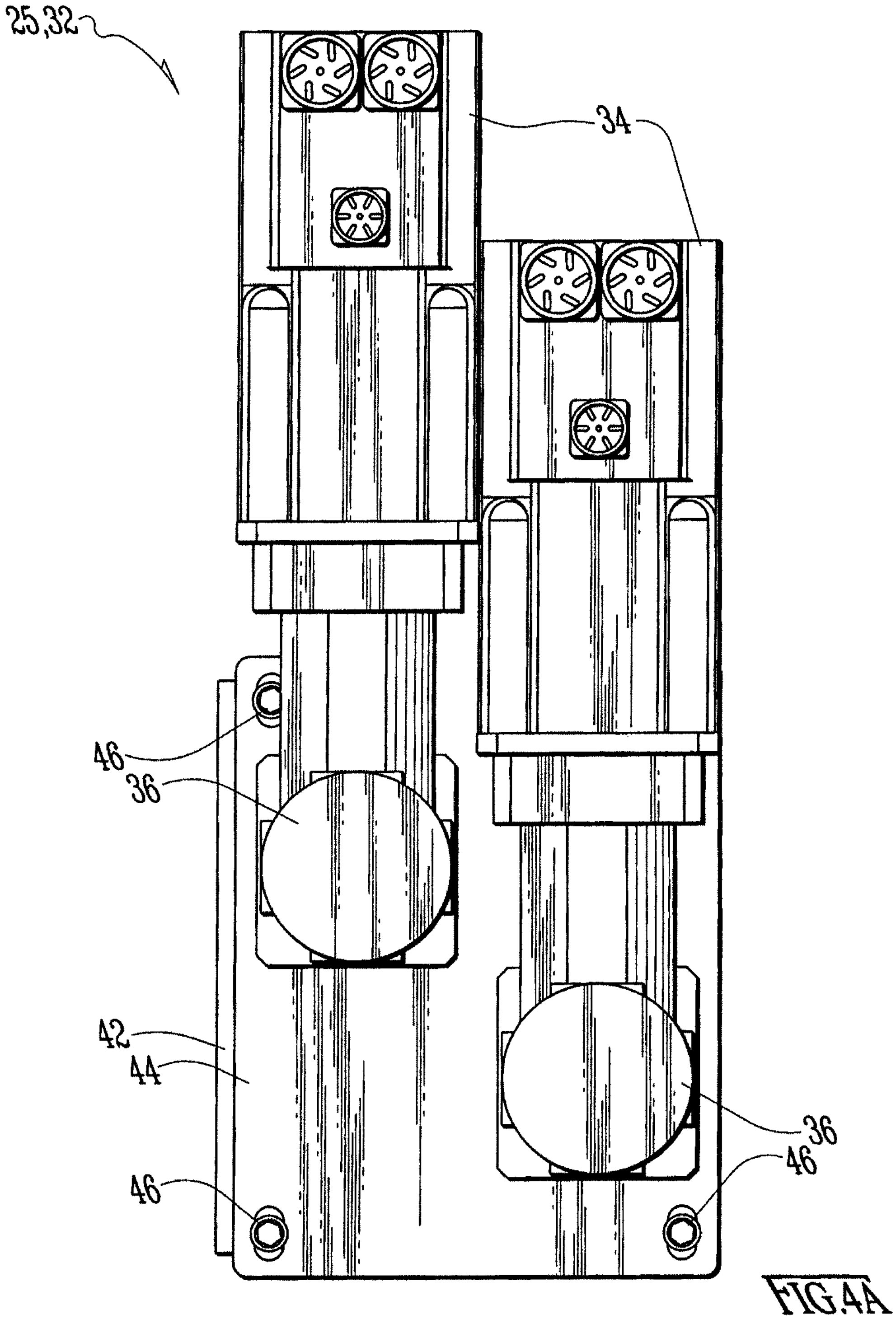
FIG. 4A is a top plan view of FIG. 3A.
Figure 4B:
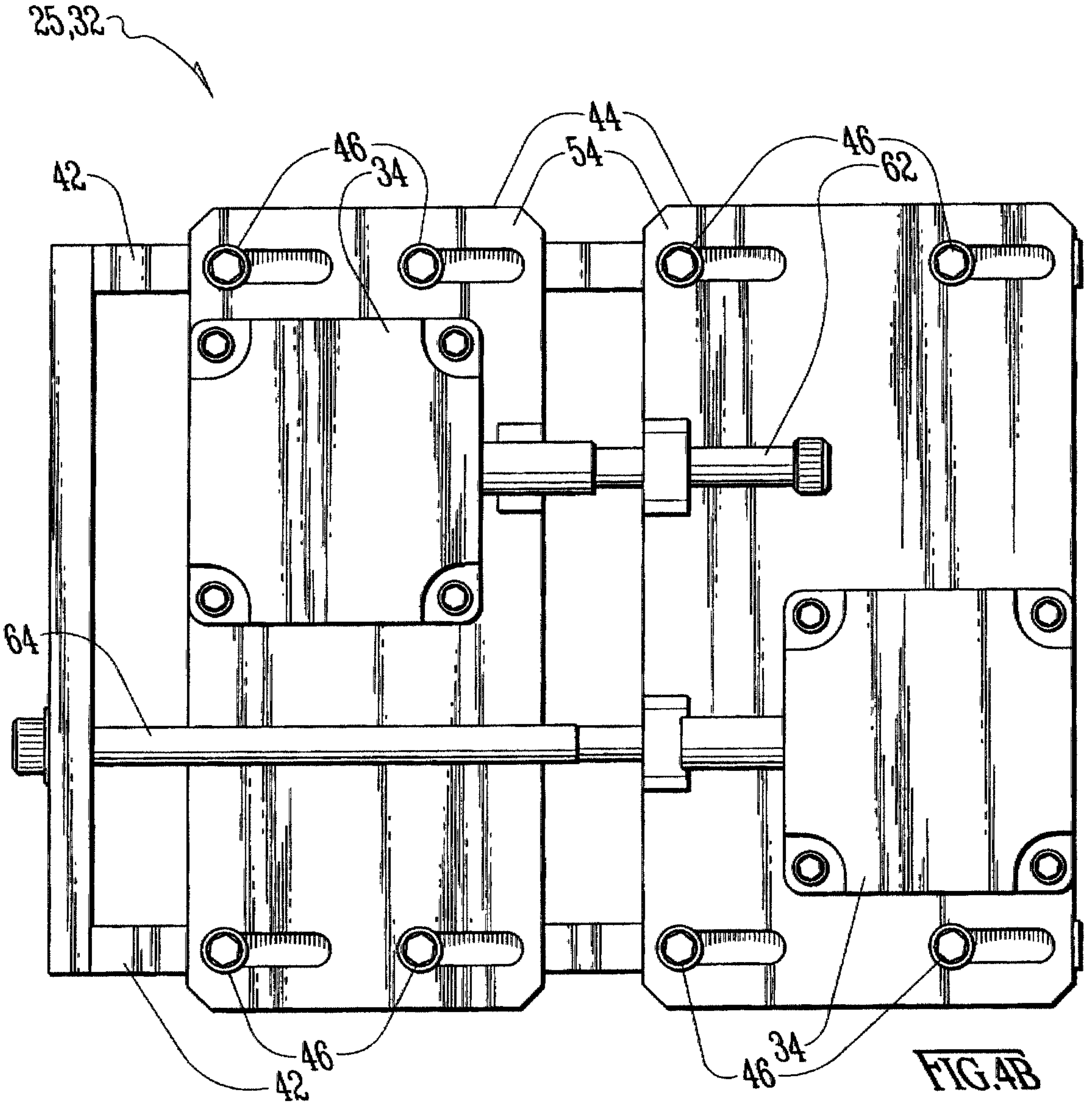
FIG. 4B is a top plan view of FIG. 3B.
Figure 5:
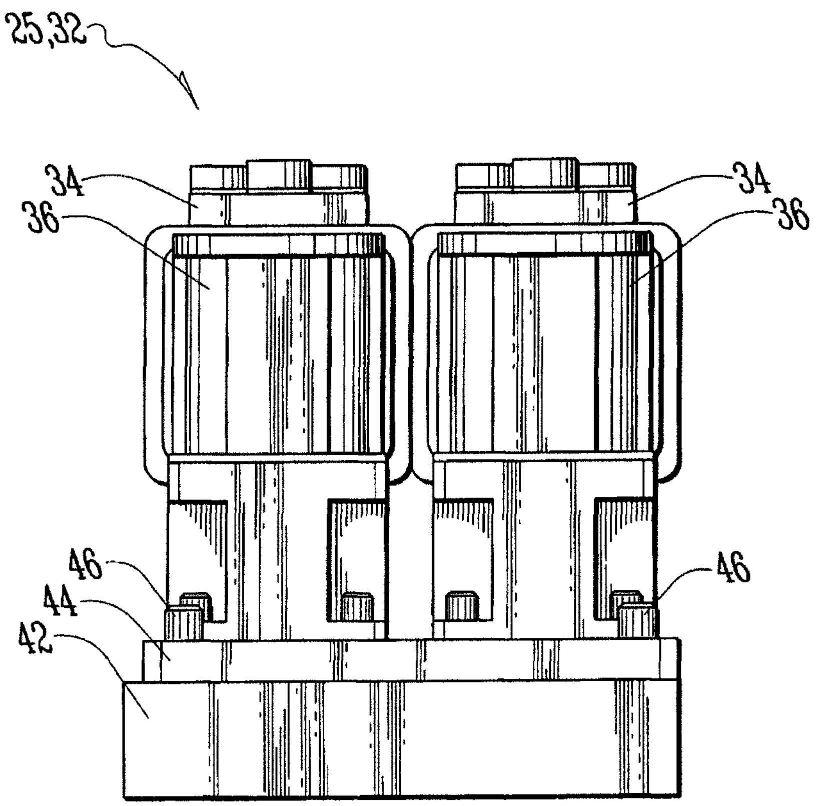
FIG. 5 is a left side elevational view of FIG. 3A.

FIGS. 3B and 4B show that a corresponding tensioning provisions comprising respective (short and long) threaded drive rods 62 and 64 is incorporated in the combined drive and tensioning system 33 in FIGS. 1B, 2B, 3B and 4B.

Figure 11:
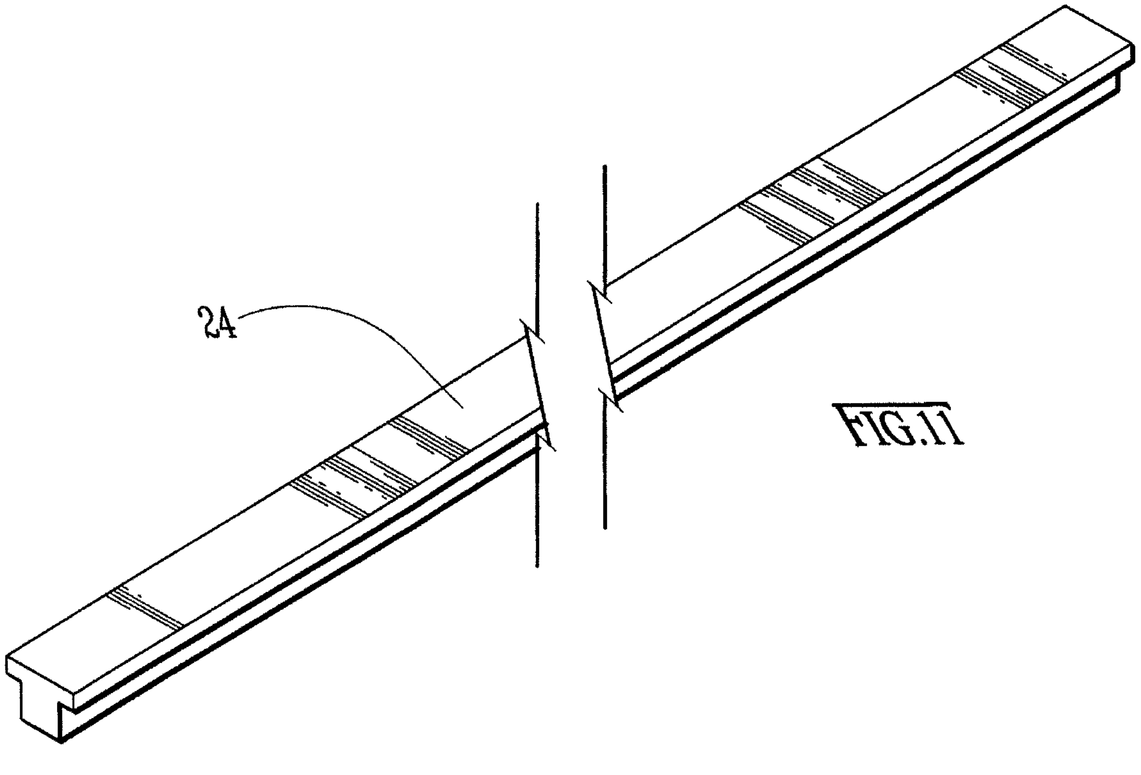
FIG. 11 is an enlarged scale perspective view of detail of a single jigging bar in FIG. 1A or 1B, with central portions broken away.
Figure 12:
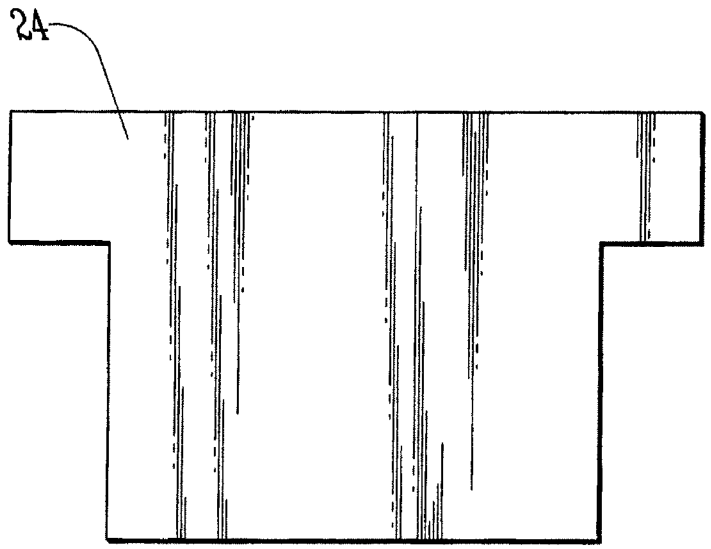
FIG. 12 is an enlarged scale end (front or rear) elevational view thereof.

FIGS. 11 and 12 show better several aspects of a first embodiment of jigging bars 24. They are T-shaped in cross-section and when juxtaposed in pairs as shown better still in FIG. 17, the jigging bars 24 define the slot 26, and the slot 26 takes on an inverted-T shape. FIG. 11 shows that the jigging bars 24 are rather slender, preferably about twelve to sixteen feet long (~3½ m and ~5 m). FIG. 12 shows that the jigging bars 24 are substantial in cross-section, comprising in accordance with one preferred and non-limiting embodiment a block two and half inches (~6 cm) wide by one and half inch (~4 cm) high, with a stem one and half inch wide (~4 cm) by one inch tall (2.54 cm).

FIGS. 13 through 17 show better aspects of the puck carriage 74. FIG. 17 shows better still that the carriage 74 traverses in the slot 26 defined between parallel jigging bars 24.

In FIG. 13, the carriage 74 comprises a main block 78 that carries a puck-mounting pin 76 (again, puck 28 is not shown, but see, eg., FIG. 17). FIG. 26 shows better that the carriage 74 serves as a splice for the tag ends of the drive belt 92 and/or 94.

Figure 15:
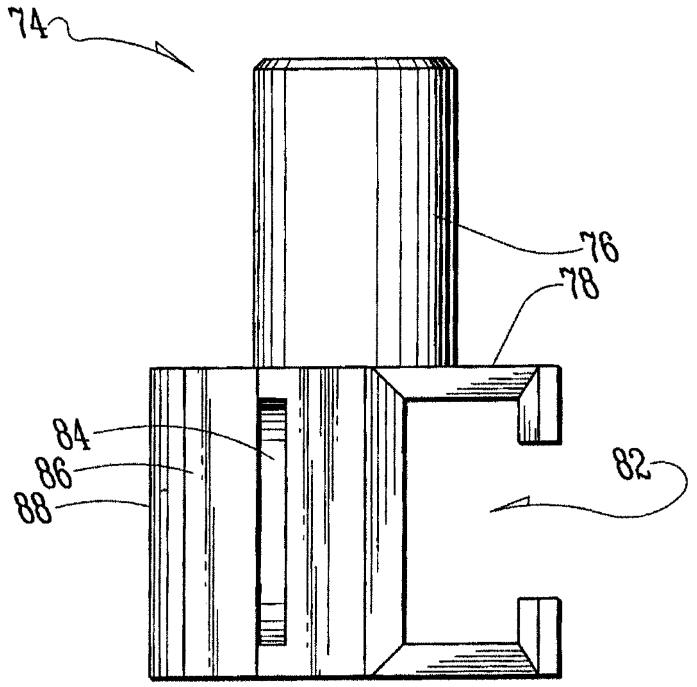
FIG. 15 is an end (front) elevational view of FIG. 13.
Figure 16:
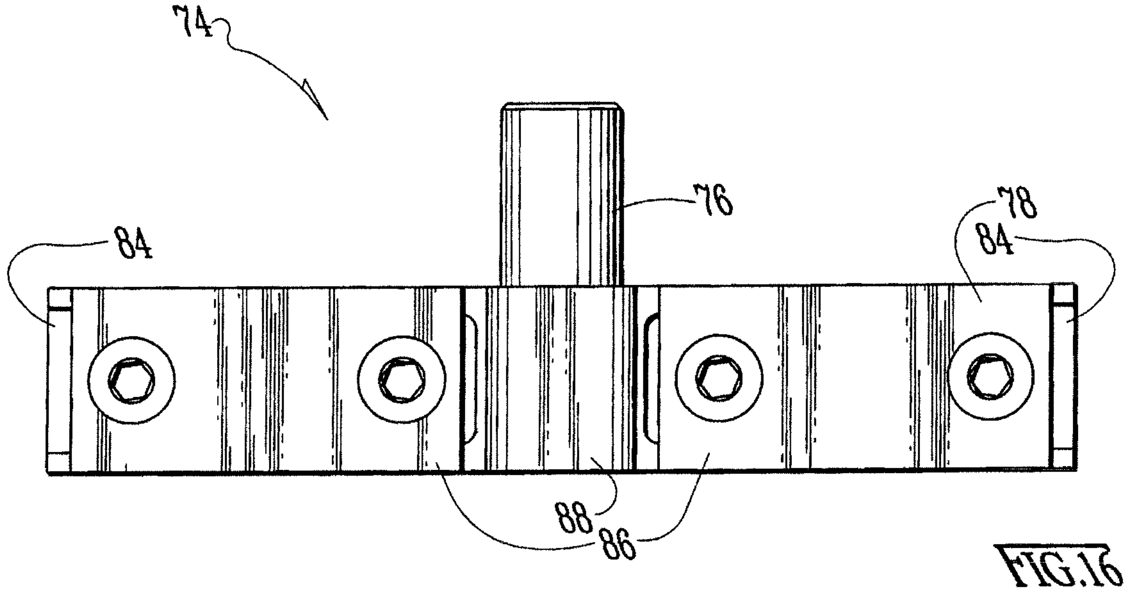
FIG. 16 is a left side elevational view FIG. 13.

As FIG. 15 shows better, the main block 78 defines one and another C-shaped, opposite channels 82 and 84 respectively. Channel 82 is open all the through the axial extent thereof through the main block 78. Channel 84 optionally differs in that it is a clamping channel 84 and is partitioned by slide abutment 88.

FIGS. 13-17 taken together show better aspects of the manner of driving the carriage 74. Each slot 26 that is defined between jigging bars 24 is occupied by two carriages 74, but only one is shown in FIGS. 13-17. This one carriage 74 is driven by an involved belt 94 which has two ends. This carriage 74 also allows a non-involved belt 92 to pass without obstruction for driving another carriage 74 in the same slot (see, eg., FIG. 2A or 2B).

To refer back briefly to FIG. 2A or 2B, each of the pair of pucks 28 carried by its respective carriage 74 in the same slot 26 can traverse that slot 26 independently of each other, but the carriages 74 cannot pass one another. Nevertheless, the pucks 28 can define a spacing between each other.

Resuming again in FIGS. 13-17 and FIG. 26, the ends of the belt 92 and/or 94 are clamped on one side and the other of the slide abutment 88 of the main block 78 by belt clamps 86. These belt clamps 86 have tooth formations to better clamp the belt 92 and/or 94 and by meshing into the teeth of the belt 92 and/or 94. These belts 92 and 94 are considered to be essentially endless, wherein the carriage 74 merely forms a splice between the opposed tag ends thereof.

Again, the involved belt 94 begins and terminates in channel 84 on opposite sides of the slide abutment 88, the beginning end and the terminating end thereof being clamped to the carriage 74 by belt clamps 86.

From its beginning to its termination, the involved belt 94 occupies one-half of slot 26 (the other half occupied by the non-involved belt 92) and extends from carriage 74 towards drive system 32 or 33 to loop around one drive pulley 38, then extends towards the return provision 31 (and/or tensioning system 30) to loop around one idler pulley 52, and then ultimately returns to its termination about where its beginning is, again at carriage 74.

The T-shaped jigging bars 24 not only form an inverted-T shaped slot which serves as the major slideway for the carriages 74 and locating pins (eg., carrying locating pucks 28). The pair of T-shaped jigging bars 24 also form an outboard pair of tubular conduits for the return runs of the belts 92 and 94 to return through. That is, each belt 92 or 94 comprises an elongated return run and an elongated other run to which one carriage 74 is affixed.

Given the foregoing, the drive pulley 38 that drives this belt 94 and results in moving the carriage 74 in the slot 26. In contrast, turning the other drive pulley 38 that drives belt 92 does not move this carriage 74 in FIGS. 13-17. Belt 92 is free to pass through the carriage 74 by virtue of the open channel 82. Belt 92 is, however, readily available in service of independently driving the other carriage 74 (this other carriage is not shown in FIGS. 13-17) that occupies this slot 26 with the carriage 74 that is indeed shown in FIGS. 13-17.

Briefly, in connection with the clamping channel 84, FIG. 17 shows better that it is served by the sliding abutment 88 sliding against the stem of the adjacent jigging bar 24 in order to avoid sliding contact by either the belt 94 or its clamps 86.

FIG. 17 is a front edge elevational view of either the FIG. 1A or 1B combined return provision 31 and tensioning system 30, except that here in FIG. 17, not only the return provision 31 tensioning system 30 but also a cover therefor have been removed from view. This is done to reveal how the carriage 74 and locating pin for pucks 28 occupy the inverted-T shaped slot 26 defined by a pair of the T-shaped jigging bars 24 as better shown by FIGS. 11 and 12.

FIG. 17 shows better how the counter-wound drive belts 92 and 94 are rigged as well. The locating puck 28 is mounted on the respective locating pin above the working plane 40 of the top surfaces of the T-shaped jigging bars 24. The nut tightening the locating puck 28 to the locating pin can be tightened such that the puck 28 and carriage 74 can clamp on the shoulders of the bars 24 that define the vertical part (eg, upper narrow part) of the inverted-T shaped slot 26. In others the puck 28 can be used as an upper jaw of a clamping feature to clamp it tight in place.

FIG. 17 further shows a pair of infill plates 96 fastened or affixed to the table deck surface 22 flanking the pair of T-shaped jigging bars 24, and creating a table work surface (or work-piece support surface) flush with the elevation of the working plane 40 of the top surfaces of the T-shaped jigging bars 24.

Pause can be taken to provide the following remarks, some which might be redundant but are included for better illumination of certain aspects of the invention.

If it is preferred to keep the airspace above the front edge of the jigging table 22 flush with the work-piece support surface (which is contained in plane 40), then preferably the tensioning provisions are moved to the drive-side side edge of the table.

The drive motors 34 are preferably step motors. They can be either vertically mounted or horizontally mounted with a right-angle gear box. The horizontal mounting does provide for lower airspace interference, but if work pieces and completed trusses are always only going to be put on and taken off the jigging table 22 from the front edge, then this is not a worry.

Direct clamping by tightening nuts on the pucks 28 is desirable when some of the wooden lumber has bows in it. The bow in the lumber can put sufficient lateral pressure on the pucks to move them out of alignment. The pucks can force the belts to drive the motors a little bit. This is especially observed with the vertical mount motors.

While not shown, an alternative drive source for the drive wheels 38 might be a hand crank. In fact, in economic versions of the truss jigging system 20 in accordance with the invention, it might be preferred to provide it in a hand-crank version only. It would further be preferred to provide a digital read-out for the location of the locating pucks 28 (or locating pins).

Figure 6:
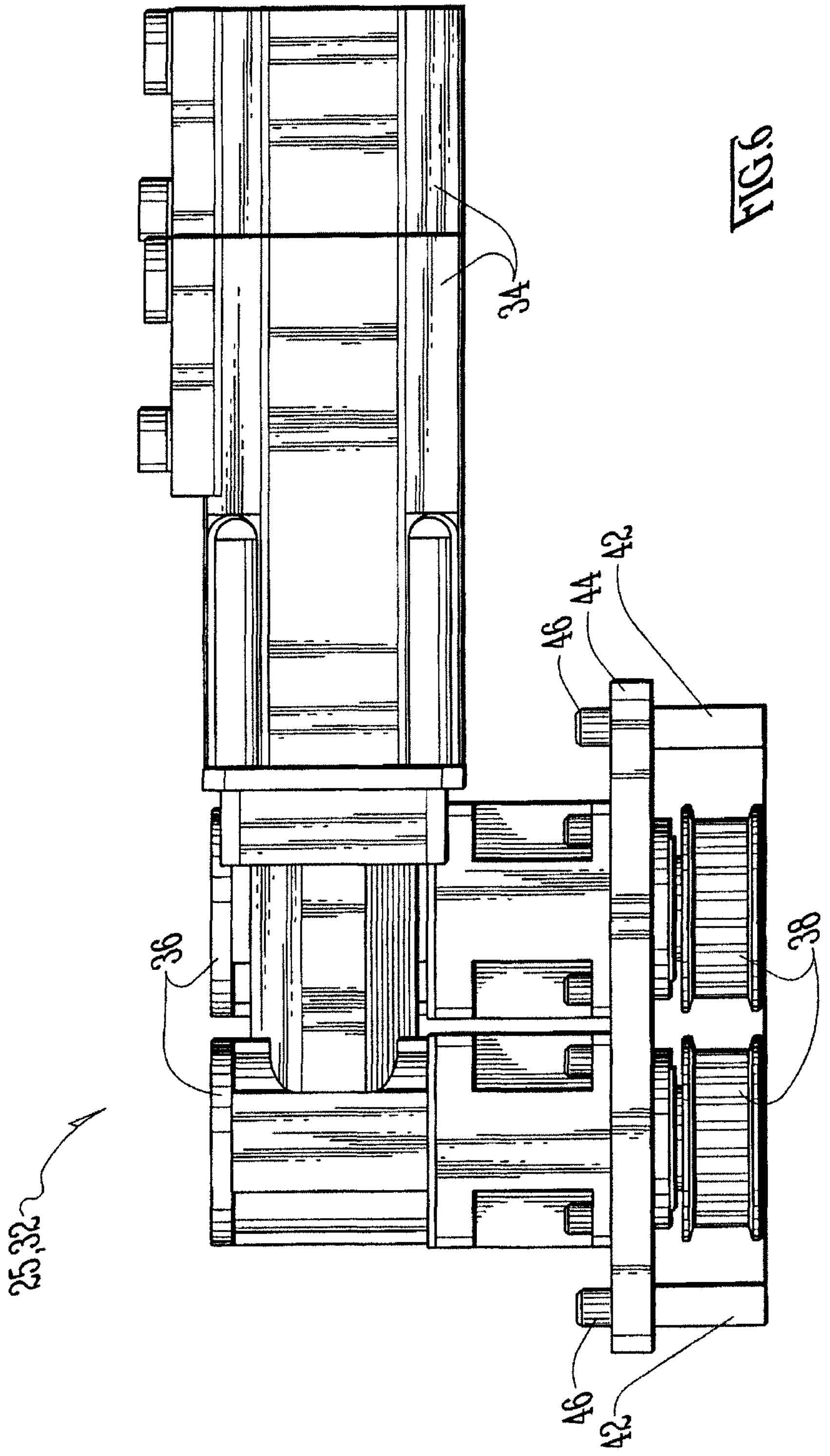
FIG. 6 is an end (front) elevational view FIG. 3A of the inboard edge.

FIGS. 2A and 2B show the general layout of the original concept of the truss jigging system in accordance with the invention. FIGS. 3A, 4A and 6 show the right angle drive system 32 on a fixed base. FIGS. 3B and 4B show a vertical drive system 33 on an adjustable base. FIGS. 7A and 8-10 show the adjustable tensioning system base 30. FIG. 7B shows the fixed, and flush mount, return provision 31.

FIG. 18 is a perspective view comparable to FIG. 3A, except showing that the flexible non-metal belts 92/94 for the various drive systems 32/33 hereof can readily substituted by a metal link roller chain 140 (eg., a bike chain or timing chain and the like) driven by a drive sprocket 142.

FIG. 21 is a perspective view comparable to FIG. 1B and more particularly of certain detail encompassing a wider radius extending further outward from the circle indicated as detail VIIA-VIIA in FIG. 1B.

FIG. 21 is differs from FIG. 1B in that (1) it is a bottom perspective view rather than an overhead perspective wherein the lower support deck is not shown but as spaced flanking infill sections 96 are indicated in hidden line, (2) it is on an enlarged scale, (3) it is showing a chain drive 140 instead of a belt drive 92 and 94, and (4) it is showing a chain drive return provision 31 which is not a rotatable idler sprocket but a static rub surface 150.

FIG. 22 shows one such static rub surface 150 in isolation and partly in section. Static rub surfaces for conveyors are known as shown by for example and without limitation the polymeric nosebar 82 in U.S. Pat. No. 6,427,831—Norton, the disclosure of which is incorporated herein by this reference thereto.

The static rub surface 150 as disclosed herein appears like a toothless pulley wheel in that it is fully cylindrical. But to operate stationarily, the static rub surface 150 only need to provide more or less about 180° of geometry rather than a full 360°. In other words, the full pulley wheel geometry of the static rub surface 150 could be chopped in half (or perhaps less), and the static rub surface 150 would work fine in service as a return provision 31.

The surface shading in FIG. 22 suggests that the static rub surface 150 is made of a resilient material and is not metallic. But the static rub surface 150 is shown that way for non-limiting convenience and could be made of metallic materials in the alternative. It is believed the wear issues are tolerable not only because (1) the chains or belts do not travel around the static rub surfaces at high velocity (2) nor under high tension but also because (3) the operation of the chains or belts are relatively intermittent. Once an array of positions of the pucks 28 is set by the control system (see, eg., FIG. 2A) for a given configuration of trusses for a given production run, the positions of the pucks 28 stay still for an extended period of time until reset for a subsequent configuration of trusses for a subsequent production run.

If the wheel 150 of FIG. 22 (more particularly previously referred to as static rub surface 150, but it is depicted as a wheel) were mounted for passive rolling, the wheel 150 would essentially be a toothless idler wheel, toothless idler roller or toothless idle pulley:—it could readily be referred to by any of those names.

FIG. 23 is a bottom perspective view comparable to FIG. 21 wherein again the lower support deck 23 as well as spaced flanking infill sections 96 are indicated in hidden line. FIG. 23 differs in that it is showing a linear (puck-driving) drive system 25 comprising of reversibly (clockwise/counter-clockwise) turning threaded drive rods 160 coupled with respective internally-threaded carriages 162. FIG. 24 is a section view taken along line XXIV-XXIV in FIG. 23, and shows the lower support deck 23, infill sections 96 mounted on the lower support deck 23 and modified jigging bars 24 filling in the interspaces between adjacent spaced infill sections 96 and the slideways 26 of the carriages 162.

FIG. 25 is a bottom perspective view comparable to FIG. 21 wherein again the lower support deck is not shown but the spaced flanking infill sections 96 are indicated in hidden line. FIG. 25 differs in that it is showing a linear (puck-driving) drive system 25 comprising of toothed drive belts 92 (or 94) and further showing the return provisions 31 comprising static rub surfaces 150 as shown in FIGS. 21 and 22.

FIG. 26 is an enlarged-scale bottom perspective view of the carriage 74 in FIG. 25 and corresponding to the carriage 74 shown in (among other views) FIG. 13. FIG. 26 differs in that it more accurately shows how the carriage 74 serves as a splice for the tag ends of drive belt 92 or 94 (which drive belts are omitted in FIG. 13).

FIG. 27 is a bottom perspective view comparable to FIG. 23 wherein again the lower support deck 23 as well as spaced flanking infill sections 96 are indicated in hidden line. FIG. 27 differs in that it is showing a linear (puck-driving) drive system 25 comprising of a reversibly (clockwise/counter-clockwise) turning smooth-walled drive rods 170 coupled with respective carriages 172 that incorporate linear drive nut technology as shown by, for example and without limitation, U.S. Pat. No. 2,940,322—Uhing, the disclosure of which is incorporated herein by this reference thereto. FIG. 28 is a section view taken along line XXVIII-XXVII in FIG. 27 and showing the internal rings of the carriage 172.

FIG. 29 is a bottom perspective view comparable to FIG. 27 except the lower support deck 23 is shown in solid line the flanking infill sections are removed from view. FIG. 29 differs in that it is showing a linear (puck-driving) drive system 25 comprising a rack-and-pinion drive 174.

Given the foregoing, the following is a brief glossary of terms representing general categories and then exemplary terms that refer to more specific examples of the general categories. So for example, the term 'linear drive(s)' as used herein includes any means for moving the locating pins (also called pucks) 28 back and forth in the respective slots 26 therefor, and such means including without limitation:— belt drives, chain drives, elongated rotating drive rods regardless whether formed with screw thread or not (eg., smooth walled), rack-and-pinion drive and so on.

The term 'chain(s)' or 'belt(s)' as used herein includes without limitation:— any of metal link roller chains and the like; or, non-metallic (or essentially non-metallic) flexible belts such as and without limitation any of rubber, plastic, urethane or other substances, the stronger varieties often reinforced with any of steel wire, DELRIN® (polyoxymethylene) or glass impregnated NYLON® (eg., a designation for a family of synthetic polymers, based on aliphatic or semi-aromatic polyamides) and the like, and in any of toothed or toothless formations.

The term 'return provision(s)' as used herein includes without limitation:—:

any of static rub surfaces or passive rolling idler provisions including sprockets, toothed wheels or pulleys and toothless rollers, wheels or pulleys, and so on.

The term 'drive wheel(s)' as used herein includes without limitation:— any of sprockets, toothed wheels or toothless wheels such as and without limitation toothless pulleys.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A truss jigging system comprising:

a table forming a support plane on which truss pieces are supported, the table extending between a front edge and a spaced-away back edge, thereby defining a front to back direction, and being elongated side to side between a left side edge and a spaced-away right side edge;

the table being formed with a plurality of elongated, narrow surface slots through the support plane and extending on generally parallel axes to each other in the front to back direction, the surface slots being recessed down in the table to widen out into enlarged, tubular slideways that are spaced below the support plane and correspondingly are elongated and extend generally parallel with the same axis as the respective surface slot;

a plurality of locating pins;

a plurality of carriages for not only inserting into the slideways for sliding transit therein but also for carrying one of the plurality of locating pins for sliding transit therewith while the respective locating pin extends through the surface slot and protrudes above the support plane;

a plurality of drive belts or chains, one of said drive belts or chains for each one of the carriages;

a plurality of return provisions, one of said return provisions for each one of the slideways, and each of said return provisions disposed proximate the front edge of the table to service a respective one of the slideways; and a plurality of drive wheels or sprockets, one of said drive wheels or sprockets for each one of the slideways, and each of said drive wheels or sprockets disposed proximate the back edge of the table to service a respective one of the slideways;

wherein the plurality of drive wheels or sprockets are driven by a plurality of drive motors, one of said plurality of drive motors for driving a respective one of the plurality of drive wheels or sprockets;

the plurality of drive motors are mounted to the table along the back edge and project above the support plane.

2. The truss jigging system of claim 1, wherein:

the drive chains or belts can comprise any of metal link roller chains; or, non-metallic or essentially non-metallic flexible belts.

3. The truss jigging system of claim 1, wherein:
the return provisions can comprise any of:—
static rub surfaces,
passive rolling sprockets,
passive rolling toothed wheels, toothed rollers or toothed pulleys, or
passive rolling toothless wheels, toothless rollers or toothless pulleys.

4. The truss jigging system of claim 1, wherein:
the drive wheels comprise any of:—
sprockets,
toothed wheels, toothed rollers or toothed pulleys, or
toothless wheels, toothless rollers or toothless pulleys.

5. The truss jigging system of claim 1, wherein:
each one of the drive belts or chains is strung around a respective one of the return provisions and a respective one of the drive wheels or sprockets such that each one of the drive belts or chains comprises a pair of elongated runs, one of the runs being an elongated return run between the respective drive wheel or sprocket and respective return provision, and the other run being spaced and opposite to the one run, said other run having a respective one of the carriages affixed thereto, or having opposed spaced tag ends which do not overlap each other but the respective carriage being affixed thereto whereby the carriage forms a splice between the opposed spaced tag ends of the respective one of the drive belts or chains, and coursing through the respective slideway that the respective drive wheel or sprocket and respective return provision service, such that, driving the respective drive wheel or sprocket moves the respective locating pin back and forth along an axis in a front to back direction.

6. The truss jigging system of claim 5, wherein:
the table defines a plurality of inverted-T shaped slots comprising an upper relatively narrower portion above a lower relatively broader portion wherein the upper relatively narrower portions correspond to the surface slots and the lower relatively broader portions correspond to the slideways.

7. The truss jigging system of claim 6, wherein:
the table further comprises a pair of parallel jigging bars for each inverted-T shaped slot.

8. The truss jigging system of claim 7, wherein:
the table further comprises a support deck below the level of and for supporting the jigging bars, the support deck extending between a front edge and a spaced-away back edge and being elongated side to side between a left side edge and a spaced-away right side edge.

9. The truss jigging system of claim 8, wherein:
the jigging bars have top surfaces level with the support plane; and
the table further comprises a multiplicity of infill sections which are elongated between a front edge and spaced back edge and compact between a left edge and spaced right edge, and sized for filling in between a bar of a first pair of jigging bars and a bar of a second pair of jigging bars, and said infill sections being supported by the support deck for presenting a work surface level with the tops of the jigging bars and level with the support plane.

10. The truss jigging system of claim 9, wherein:
at least one adjacent pair of one of the jigging bars and one of the infill sections define a tubular conduit parallel to the upper relatively narrower portion of the inverted-T shaped slot and providing a passageway for the return run of the drive belt or chain.

11. The truss jigging system of claim 1, further comprising:
a second plurality of plurality of locating pins;
a second plurality of carriages for not only inserting into the slideways for sliding transit therein but also for carrying one of the second plurality of locating pins for sliding transit therewith while said one of the second plurality of locating pins extends through one of the surface slots and protrudes above the support plane;
a second plurality of drive belts or chains, one of said second plurality of drive belts or chains for each of the second plurality of carriages;
a second plurality of return provisions, one of said second plurality of return provisions for each one of the slideways, and each of said second plurality of return provisions disposed proximate the front edge of table to service a respective one of the slideways;
a second plurality of drive wheels or sprockets, one of said second plurality of drive wheels or sprockets for each slideway, and each of said second plurality of drive wheels or sprockets disposed proximate the back edge of table to service a respective one of the slideways;
wherein each of the second plurality of drive belts or chains is strung around a respective one of the second plurality of return provisions and a respective one of the second plurality of drive wheels or sprockets such that each one of the second plurality of drive belts or chains comprises a one and another of elongated runs, the one of the second plurality of drive belts or chains being an elongated return run and the other run of the second plurality of drive belts or chains having a respective one of the second plurality of carriages affixed thereto, or having opposed spaced tag ends which do not overlap each other but the respective carriage being affixed thereto whereby the carriage forms a splice between the opposed spaced tag ends of the respective one of the drive belts or chains, and coursing through the respective slideway that the respective drive wheel or sprocket of the second plurality of drive wheels or sprockets and the respective return provision of the second plurality of return provisions service such that, driving the respective drive wheel or sprocket of the second plurality of drive wheels or sprockets moves the respective locating pin of the second plurality of locating pins back and forth along an axis in the front to back direction; and
wherein each said slideway services one carriage of the first plurality of carriages and one carriage of the second plurality carriages, which can be driven independently.

12. The truss jigging system of claim 11, wherein:
the table further defines a pair of tubular conduits flanking each one of the slideways, one of the pair of tubular conduits providing a passageway for the return run of the respective one of the first plurality of drive belts or chains and the other of the tubular conduits providing a passageway for the return run of the respective one of the second plurality of drive belts or chains.

13. A truss jigging system for an 'X-Y scrolling axial press style' of a truss fabricating machine; said truss jigging system comprising:
a table forming a support plane and having a front edge and back edge thereby defining a front to back direction, and a left edge and right edge;

the table being formed with a plurality of elongated, generally parallel slots extending in the front to back direction and having upper portions and lower portions;

a plurality of locating pins;

a plurality of carriages, one each of said plurality of carriages for inserting into the lower portions of a respective one of the plurality of slots for sliding transit therein, each one of the carriages also carrying a respective one of the plurality of locating pins for sliding transit therewith while the respective locating pin extends through the slot and protrudes above the support plane;

a plurality of linear drive systems, one each of said plurality of linear drive systems for each one of the carriages;

wherein the plurality of linear drive systems are driven by a plurality of drive motors, one of said plurality of drive motors for driving a respective one of the plurality of linear drive systems;

the plurality of drive motors are mounted to the table along the back edge and project above the support plane.

14. The truss jigging system of claim 13, wherein:

the linear drive systems can comprise any of:— drive chains or drive belts; and the drive chains or drive belts can comprise any of metal link roller chains; or, non-metallic or essentially non-metallic flexible belts.

15. The truss jigging system of claim 13, wherein:

the linear drive systems can comprise any of:— elongated rotating drive rods formed with screw thread, elongated rotating drive rods which are smooth walled, or rack-and-pinion drive.

16. The truss jigging system of claim 13, wherein:

the drive motors comprise electric motors that turn on axes which are generally perpendicular to the slots and sliding transit of the carriages.

17. The truss jigging system of claim 13, wherein:

the drive motors comprise electric motors that are mounted upright and that turn on axes which are generally perpendicular to the slots and sliding transit of the carriages.

18. The truss jigging system of claim 13, further comprising:

a lower support deck underlying the table and extending in a plane between a front edge and a spaced-away back edge and between a left side edge and a spaced-away right side edge;

said plane of the lower support deck being lower than the table as well as lower than the locating pins, the carriages, the linear drive systems and the drive motors whereby in order to accommodate such 'X-Y scrolling axial press style' truss fabricating machines, which are characterized by having a lower crossbeam that travels laterally left and right closely underneath the lower support deck.

19. The truss jigging system of claim 18, wherein:

the table comprises a multiplicity of infill sections, wherein said infill sections are elongated between a front end and spaced back end and compact between a left edge and spaced right edge, and disposed on the lower support deck in spaced parallel columns which are columnar between the front to back edge of the table;

wherein adjacent infill sections of the multiplicity of infill sections are spaced and define a respective columnar interspace therebetween;

said carriages and the linear drive systems being disposed and operative in respective interspaces between adjacent spaced infill sections.

20. The truss jigging system of claim 19, wherein:

each interspace between adjacent spaced infill sections receives a one and another of the carriages and linear drive systems such that the one carriage and the respective locating pin thereof can be driven independently of the other carriage and respective locating pin thereof.

* * * * *